US008696051B2

(12) United States Patent
Charbonneau et al.

(10) Patent No.: US 8,696,051 B2
(45) Date of Patent: Apr. 15, 2014

(54) SYSTEM FOR ABSORBING AND DISTRIBUTING SIDE IMPACT ENERGY UTILIZING A SIDE SILL ASSEMBLY WITH A COLLAPSIBLE SILL INSERT

(71) Applicant: Tesla Motors, Inc., Palo Alto, CA (US)

(72) Inventors: Alexi Charbonneau, Redondo Beach, CA (US); Malcolm Burgess, Mountain View, CA (US); Vivek Attaluri, Union City, CA (US); Hitendra Laxmidas Gadhiya, Irvine, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 0 days.

(21) Appl. No.: 13/707,348

(22) Filed: Dec. 6, 2012

(65) Prior Publication Data

US 2013/0088045 A1    Apr. 11, 2013

Related U.S. Application Data

(63) Continuation of application No. 13/707,211, filed on Dec. 6, 2012, which is a continuation-in-part of application No. 13/308,300, filed on Nov. 30, 2011.

(60) Provisional application No. 61/426,254, filed on Dec. 22, 2010.

(51) Int. Cl.
*B62D 25/20*    (2006.01)

(52) U.S. Cl.
USPC ..................... 296/209; 296/187.12

(58) Field of Classification Search
USPC .................. 296/187.12, 193.05, 203.03, 209; 903/903, 907, 952
See application file for complete search history.

(56) References Cited

U.S. PATENT DOCUMENTS

| 4,174,014 | A |   | 11/1979 | Bjorksten |
|-----------|---|---|---------|-----------|
| 4,336,644 | A |   | 6/1982  | Medlin |
| 4,352,316 | A |   | 10/1982 | Medlin |
| 4,944,553 | A | * | 7/1990  | Medley et al. ........... 296/203.03 |
| 5,086,860 | A |   | 2/1992  | Francis et al. |
| 5,305,513 | A |   | 4/1994  | Lucid et al. |
| 5,370,438 | A | * | 12/1994 | Mori et al. ................ 296/203.02 |
| 5,534,364 | A |   | 7/1996  | Watanabe et al. |
| 5,613,727 | A | * | 3/1997  | Yamazaki ................ 296/203.03 |
| 5,619,784 | A | * | 4/1997  | Nishimoto et al. ............. 29/430 |
| 5,620,057 | A |   | 4/1997  | Klemen et al. |
| 5,639,571 | A |   | 6/1997  | Waters et al. |
| 5,681,668 | A |   | 10/1997 | Reed et al. |

(Continued)

FOREIGN PATENT DOCUMENTS

| JP | 63097473 | A | * | 4/1988 | ............. B62D 25/20 |
| JP | 04092781 | A | * | 3/1992 | ............. B62D 25/20 |

(Continued)

*Primary Examiner* — Glenn Dayoan
*Assistant Examiner* — Paul Chenevert
(74) *Attorney, Agent, or Firm* — J. Richard Soderberg

(57) ABSTRACT

An energy absorbing and distributing side impact system for use with a vehicle is provided, the system utilizing a collapsible side sill assembly along with multiple vehicle cross-members to achieve the desired level of vehicle side impact resistance, the combination of these elements absorbing and distributing the impact load throughout the vehicle structure. The collapsible side sill assembly includes a side sill insert, the insert divided into a collapsible portion designed to absorb impact energy and a reacting portion designed to distribute the impact energy to the vehicle cross-members.

16 Claims, 21 Drawing Sheets

(56) References Cited

U.S. PATENT DOCUMENTS

| | | | |
|---|---|---|---|
| 5,924,765 A * | 7/1999 | Lee | 296/209 |
| 6,053,564 A * | 4/2000 | Kamata et al. | 296/187.09 |
| 6,094,927 A | 8/2000 | Anazawa et al. | |
| 6,139,094 A * | 10/2000 | Teply et al. | 296/203.03 |
| 6,168,226 B1 * | 1/2001 | Wycech | 296/146.6 |
| 6,189,953 B1 * | 2/2001 | Wycech | 296/187.02 |
| 6,224,998 B1 | 5/2001 | Brouns et al. | |
| 6,227,322 B1 | 5/2001 | Nishikawa | |
| 6,322,135 B1 * | 11/2001 | Okana et al. | 296/203.03 |
| 6,354,656 B1 * | 3/2002 | Hwang | 296/209 |
| 6,357,819 B1 * | 3/2002 | Yoshino | 296/187.02 |
| 6,386,625 B1 * | 5/2002 | Dukat et al. | 296/209 |
| 6,435,601 B2 * | 8/2002 | Takahara | 296/187.03 |
| 6,447,052 B2 * | 9/2002 | Saeki | 296/187.09 |
| 6,471,285 B1 * | 10/2002 | Czaplicki et al. | 296/187.02 |
| 6,547,020 B2 | 4/2003 | Maus et al. | |
| 6,632,560 B1 | 10/2003 | Zhou et al. | |
| 6,662,891 B2 | 12/2003 | Misu et al. | |
| 6,672,653 B2 * | 1/2004 | Nishikawa et al. | 296/203.04 |
| 6,676,200 B1 | 1/2004 | Peng | |
| 6,786,533 B2 * | 9/2004 | Bock et al. | 296/187.02 |
| 6,793,274 B2 | 9/2004 | Riley et al. | |
| 6,805,400 B2 * | 10/2004 | Bruderick et al. | 296/193.09 |
| 7,090,293 B2 | 8/2006 | Saberan et al. | |
| 7,118,170 B2 * | 10/2006 | Montanvert et al. | 296/209 |
| 7,255,388 B2 * | 8/2007 | Le Gall et al. | 296/187.02 |
| 7,427,093 B2 | 9/2008 | Watanabe et al. | |
| 7,654,352 B2 | 2/2010 | Takasaki et al. | |
| 7,717,207 B2 | 5/2010 | Watanabe et al. | |
| 7,770,525 B2 | 8/2010 | Kumar et al. | |
| 7,850,229 B2 * | 12/2010 | Ihashi et al. | 296/207 |
| 7,963,588 B2 * | 6/2011 | Kanagai et al. | 296/187.12 |
| 8,002,339 B2 * | 8/2011 | Rill et al. | 296/209 |
| 8,007,032 B1 | 8/2011 | Craig | |
| 8,011,721 B2 * | 9/2011 | Yamada et al. | 296/209 |
| 8,037,096 B2 | 10/2011 | Kiya | |
| 8,047,603 B2 * | 11/2011 | Goral et al. | 296/187.03 |
| 8,066,322 B2 * | 11/2011 | Mori | 296/187.03 |
| 8,070,215 B2 * | 12/2011 | Yoshioka et al. | 296/187.12 |
| 8,091,669 B2 | 1/2012 | Taneda et al. | |
| 8,113,572 B2 * | 2/2012 | Mildner et al. | 296/209 |
| 8,308,227 B2 * | 11/2012 | Tsuruta et al. | 296/209 |
| 8,366,185 B2 * | 2/2013 | Herntier | 296/209 |
| 8,383,242 B2 * | 2/2013 | Malek et al. | 428/458 |
| 2001/0030069 A1 | 10/2001 | Misu et al. | |
| 2002/0162696 A1 | 11/2002 | Maus et al. | |
| 2003/0090129 A1 * | 5/2003 | Riley et al. | 296/203.03 |
| 2004/0016580 A1 | 1/2004 | Kronner et al. | |
| 2006/0005695 A1 | 1/2006 | Honlinger et al. | |
| 2009/0021052 A1 | 1/2009 | Kato | |
| 2009/0186266 A1 | 7/2009 | Nishino et al. | |
| 2009/0242299 A1 | 10/2009 | Takasaki et al. | |
| 2010/0025132 A1 | 2/2010 | Hill et al. | |
| 2010/0175940 A1 | 7/2010 | Taneda et al. | |
| 2010/0273040 A1 | 10/2010 | Kubota et al. | |
| 2010/0289295 A1 | 11/2010 | Yoda et al. | |
| 2010/0307848 A1 | 12/2010 | Hashimoto et al. | |
| 2011/0300427 A1 | 12/2011 | Iwasa et al. | |
| 2012/0021301 A1 | 1/2012 | Ohashi | |
| 2012/0028135 A1 | 2/2012 | Ohashi | |
| 2012/0073888 A1 | 3/2012 | Taneda et al. | |
| 2012/0103714 A1 | 5/2012 | Choi et al. | |
| 2012/0119546 A1 * | 5/2012 | Honda et al. | 296/203.01 |
| 2012/0153669 A1 * | 6/2012 | Nagwanshi et al. | 296/187.08 |
| 2012/0156539 A1 | 6/2012 | Honjo et al. | |
| 2012/0161429 A1 | 6/2012 | Rawlinson et al. | |
| 2012/0161472 A1 | 6/2012 | Rawlinson et al. | |
| 2012/0248825 A1 * | 10/2012 | Tamura | 296/209 |

FOREIGN PATENT DOCUMENTS

| | | | | |
|---|---|---|---|---|
| JP | 05170140 A | * | 7/1993 | B62D 25/20 |
| JP | 05294258 A | * | 11/1993 | B62D 25/20 |
| WO | WO 2012063393 | | 5/2012 | |

* cited by examiner

SYSTEM FOR ABSORBING AND DISTRIBUTING SIDE IMPACT ENERGY UTILIZING A SIDE SILL ASSEMBLY WITH A COLLAPSIBLE SILL INSERT

CROSS-REFERENCE TO RELATED APPLICATION

The present application is a continuation of U.S. patent application Ser. No. 13/707,211, filed 6 Dec. 2012, which is a continuation-in-part of U.S. patent application Ser. No. 13/308,300, filed 30 Nov. 2011, which claims benefit of the filing date of U.S. Provisional Patent Application Ser. No. 61/426,254, filed 22 Dec. 2010.

FIELD OF THE INVENTION

The present invention relates generally to vehicle structures and, more particularly, to means for enhancing the side impact performance of a vehicle.

BACKGROUND OF THE INVENTION

Modern vehicles use a variety of structures to protect the vehicle's occupants during a crash. Some of these structures are used to control the transmission of the crash energy to the passenger compartment while other structures, such as seat belts, head restraints, and air bags, are intended to restrain passenger movement during a crash, thereby preventing the passengers from hurting themselves as their bodies react to the crash forces. Side impact collisions present a particularly challenging problem to vehicle safety engineers, both due to the relatively low position of the rocker panels on many small vehicles as well as the difficulty of implementing an impact resistant side structure while taking into account vehicle doors and doorways.

U.S. Pat. No. 6,676,200, issued 13 Jan. 2004, discloses an automotive structure utilizing inner and outer rocker panels, a floor pan joined to the inner rocker panels, and a plurality of cross-members that extend laterally across a portion of the vehicle body. The cross-members include energy absorbing extensions designed to absorb side impact loads.

An alternate approach to achieving impact resistance is disclosed in U.S. Pat. No. 6,793,274, issued 21 Sep. 2004, in which an energy management system is integrated within various automotive structural components, e.g., vehicle frames and rails. In particular, the disclosed system uses members or inserts that are in some way attached to selected structural components of the vehicle, the members designed to both absorb and redirect the impact energy encountered during a crash. The disclosed members also help to reinforce the components to which they are attached. The patent describes a variety of ways in which the disclosed members may be incorporated into a vehicle during the manufacturing process.

U.S. Pat. No. 7,090,293, issued 15 Aug. 2006, attempts to achieve improved occupant protection through a seat assembly that is designed to provide side impact rigidity and resistance to rocker override and side impact intrusions. The disclosed seat assembly includes a frame track, a frame base slidably engaged to the frame track, a frame back rotatably engaged to the frame base, and a rear lateral support assembly that includes a support frame attached to the rear portion of the frame base. The support frame includes a tubular member that is designed to engage with a vehicle rocker panel during impact, thereby providing additional rigidity and strength to the vehicle.

U.S. Pat. No. 8,007,032, issued 30 Aug. 2011, discloses an automotive energy absorbing side structure that includes a wide-based B-pillar with an internal reinforcing tube, a rocker with an internal bulkhead, a rear rocker, and at least one cross-member extending inward from the rocker. The disclosed cross-members are designed to transfer impact loads to the floor, the cross-members and the tunnel brace.

Although vehicle manufacturers use a variety of structures and components to protect a vehicle's occupants during a side impact collision, typically these approaches provide only limited protection while significantly increasing vehicle weight. Accordingly, what is needed is a system that provides superior vehicle occupant safety, particularly from side impact collisions, while adding minimal weight from impact resistant dedicated structures. The present invention provides such a system.

SUMMARY OF THE INVENTION

The present invention provides an energy absorbing and distributing side impact system for use with a vehicle, the system comprising a pair of side sill assemblies, where each of the side sill assemblies includes a side sill insert captured between an inner side sill wall and an outer side sill wall, and where each of the side sill inserts includes a reacting portion adjacent to the inner side sill wall and a collapsible portion adjacent to the outer side sill wall; a plurality of vehicle cross-members interposed between and mechanically coupled to the inner side sill walls of the left and right hand side sill assemblies; a pair of rear torque boxes mechanically coupled to the left and right hand side sill assemblies; at least one rear torque box cross-member interposed between and mechanically coupled to the left and right hand rear torque boxes; and a pair of front torque boxes mechanically coupled to the left and right hand side sill assemblies.

In another aspect, the side sill insert may be captured between a substantially horizontal inner side sill wall and a pair of insert guide members where one of the insert guide members extends from an inner surface of the inner side sill wall and the other insert guide member extends from an inner surface of the outer side sill wall. The sill insert may be held in place using a plurality of fasteners (e.g., rivets, bolts, spot welds, adhesives, etc.). The sill insert may have a rectangularly-shaped cross-section and extend longitudinally within the side sill from a first side sill end portion proximate to one of the front torque boxes to a second side sill end portion proximate to one of the rear torque boxes. The sill insert may include a vertical internal wall that separates the reacting and collapsible portions of the insert. The reacting portion of the sill insert may be substantially square-shaped. The collapsible portion of the sill insert may be comprised of a pair of diagonal structural members that cross to form an x-shape, or two pairs of diagonal structural members each of which cross to form an x-shape, where the diagonal structural members extend between an upper sill insert wall and a lower sill insert wall. If the collapsible portion includes two pairs of diagonal structural members, the first pair of diagonal structural members closest to the outer side sill wall may be configured to collapse and deform prior to the second pair of diagonal structural members during a side impact collision.

In other aspects: the rear torque boxes may be welded to the side sill assemblies and the rear torque box cross-member(s) may be welded to the left/right rear torque boxes; the front torque boxes may be welded to the side sill assemblies; a toe board cross-member may be interposed and mechanically coupled to the left/right front torque boxes; the side sill assemblies may be fabricated from an aluminum extrusion, an aluminum alloy extrusion or a steel extrusion; and the impact energy absorbing component may be fabricated from an aluminum alloy.

A further understanding of the nature and advantages of the present invention may be realized by reference to the remaining portions of the specification and the drawings.

DESCRIPTION OF THE SPECIFIC EMBODIMENTS

In the following text, the terms "battery", "cell", and "battery cell" may be used interchangeably and may refer to any of a variety of different cell types, chemistries and configurations including, but not limited to, lithium ion (e.g., lithium iron phosphate, lithium cobalt oxide, other lithium metal oxides, etc.), lithium ion polymer, nickel metal hydride, nickel cadmium, nickel hydrogen, nickel zinc, silver zinc, or other battery type/configuration. The term "battery pack" as used herein refers to multiple individual batteries contained within a single piece or multi-piece housing, the individual batteries electrically interconnected to achieve the desired voltage and capacity for a particular application. The term "electric vehicle" as used herein may refer to an all-electric vehicle, also referred to as an EV, a plug-in hybrid vehicle, also referred to as a PHEV, or a non-plug-in hybrid vehicle, also referred to as a HEV, where a hybrid vehicle utilizes multiple propulsion sources one of which is an electric drive system. It should be understood that identical element symbols used on multiple figures refer to the same component, or components of equal functionality. Additionally, the accompanying figures are only meant to illustrate, not limit, the scope of the invention and should not be considered to be to scale.

The present invention utilizes a collapsible side sill along with multiple vehicle cross-members to achieve the desired level of vehicle side impact resistance, the combination of these elements absorbing and distributing the impact load throughout the vehicle structure. In the preferred and illustrated embodiment, impact resistance and load distribution is also benefited by the inclusion of a battery pack structure between the side sills. It should be understood that the battery pack structure is not a required element of the present invention. If, however, the battery pack is eliminated or significantly reconfigured, the present cross-members may require strengthening or additional vehicle cross-members may be required, depending upon the desired level of side impact resistance.

Figure 1:
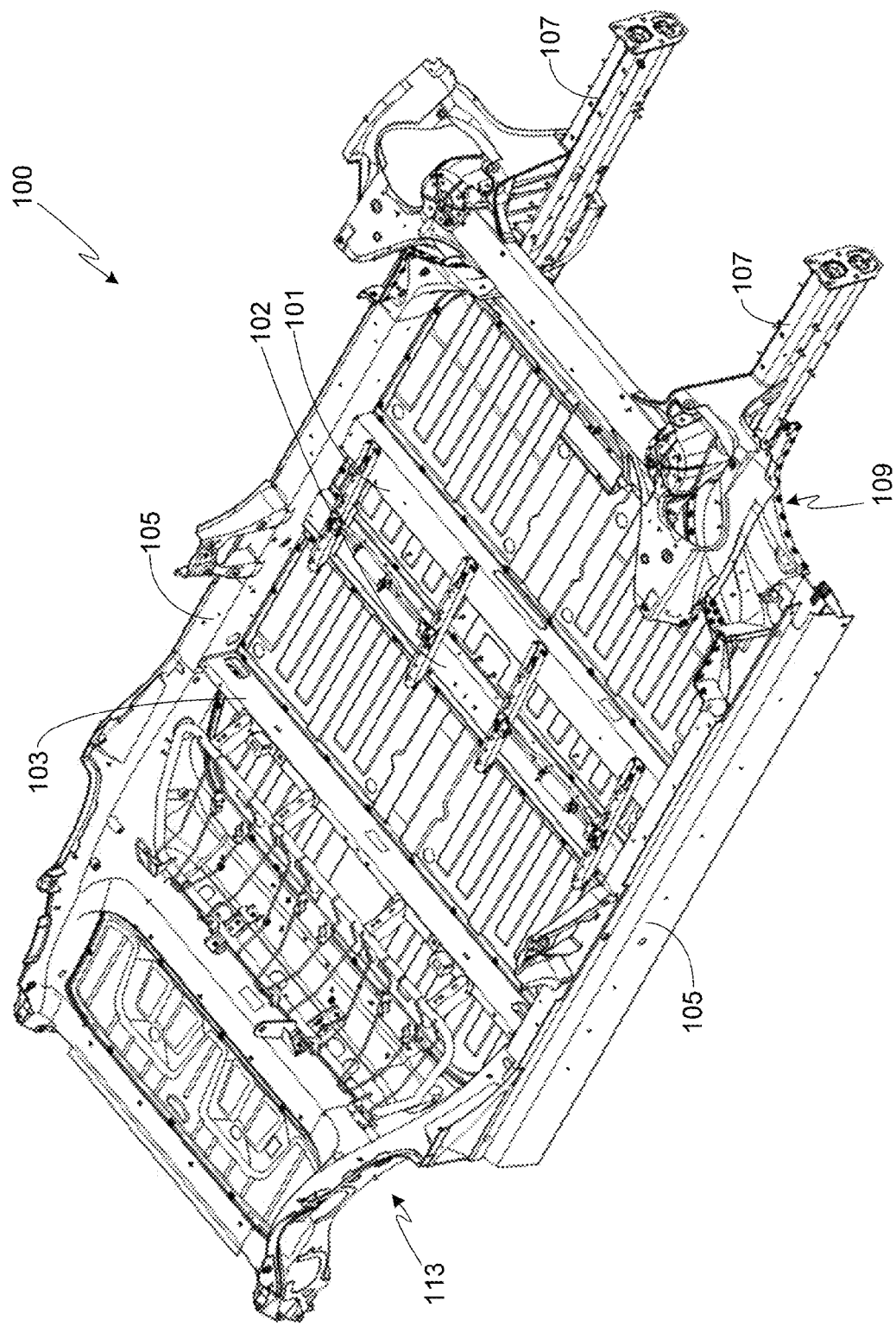
FIG. 1 provides a detailed perspective view of the primary mechanical structural elements of the underbody of a vehicle structure utilizing the invention.
Figure 2:
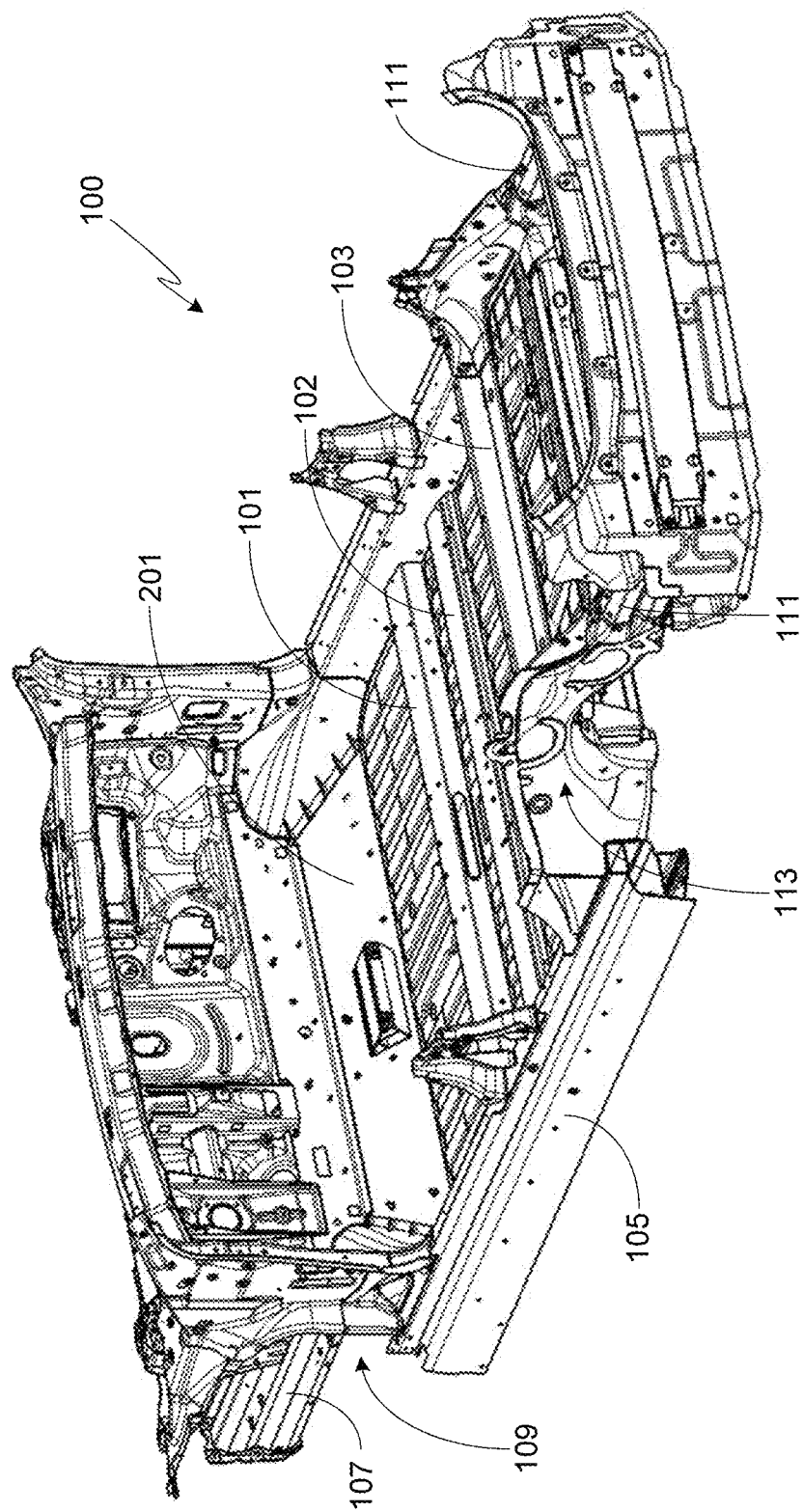
FIG. 2 provides an alternate perspective view of the primary mechanical structural elements of the underbody.

FIGS. 1 and 2 provide two different perspective views of the primary mechanical structural elements of a vehicle underbody 100. These views show three body cross-members 101-103. Body cross-members 101-103 are preferably welded to side sills 105. Also visible in these views are a pair of front rails 107 that are attached to side sills 105 using a pair of swept (i.e., curvilinear) torque boxes 109, and a pair of rear rails 111 that are attached to side sills 105 using a pair of rear torque boxes 113. Additionally in FIG. 2, a toe board 201 that is interposed between the front torque boxes 109 is visible.

Figure 3:
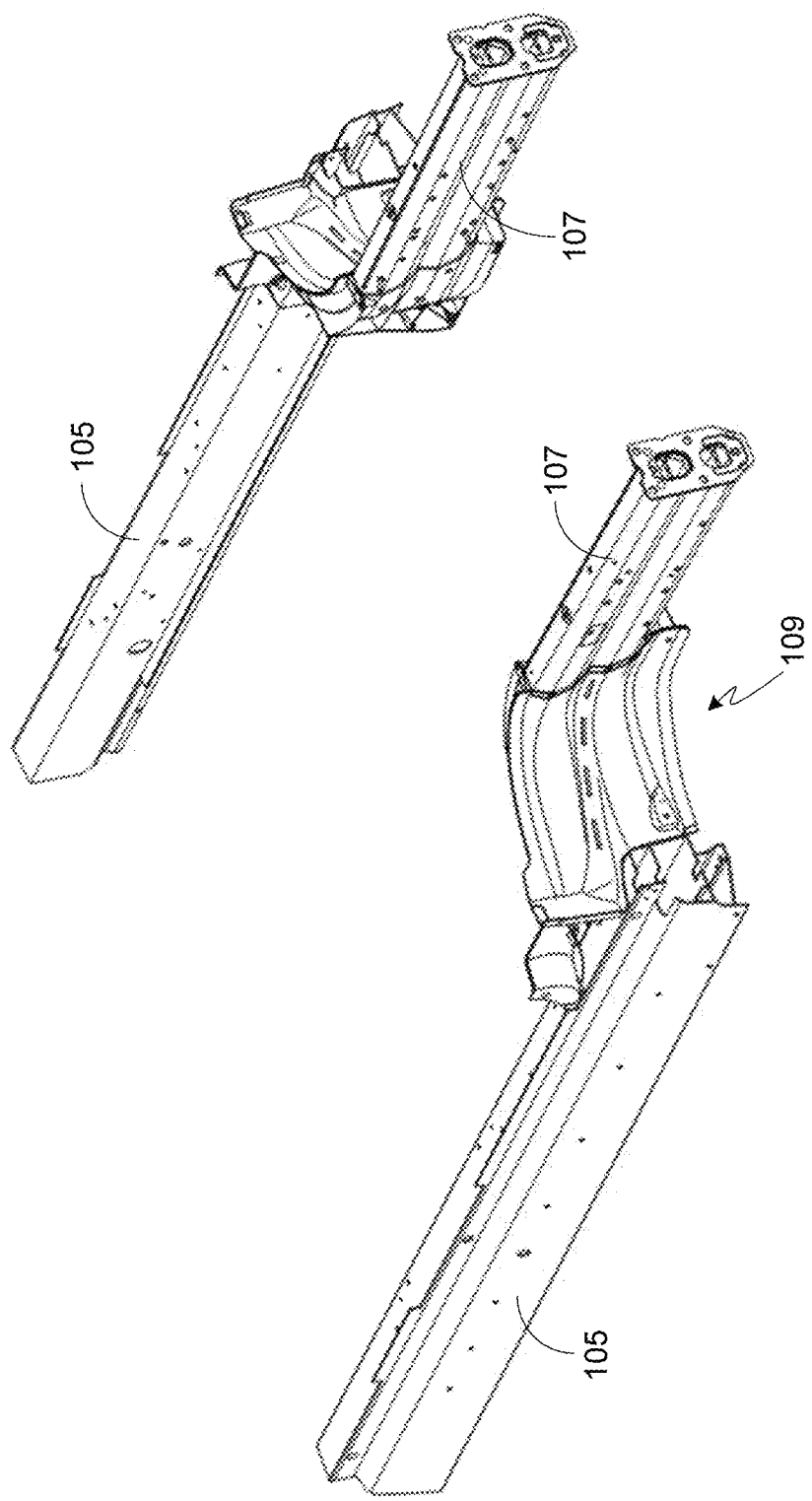
FIG. 3 provides a perspective view of the mechanical coupling of the front rails to the side sills via a pair of swept torque boxes.
Figure 4:
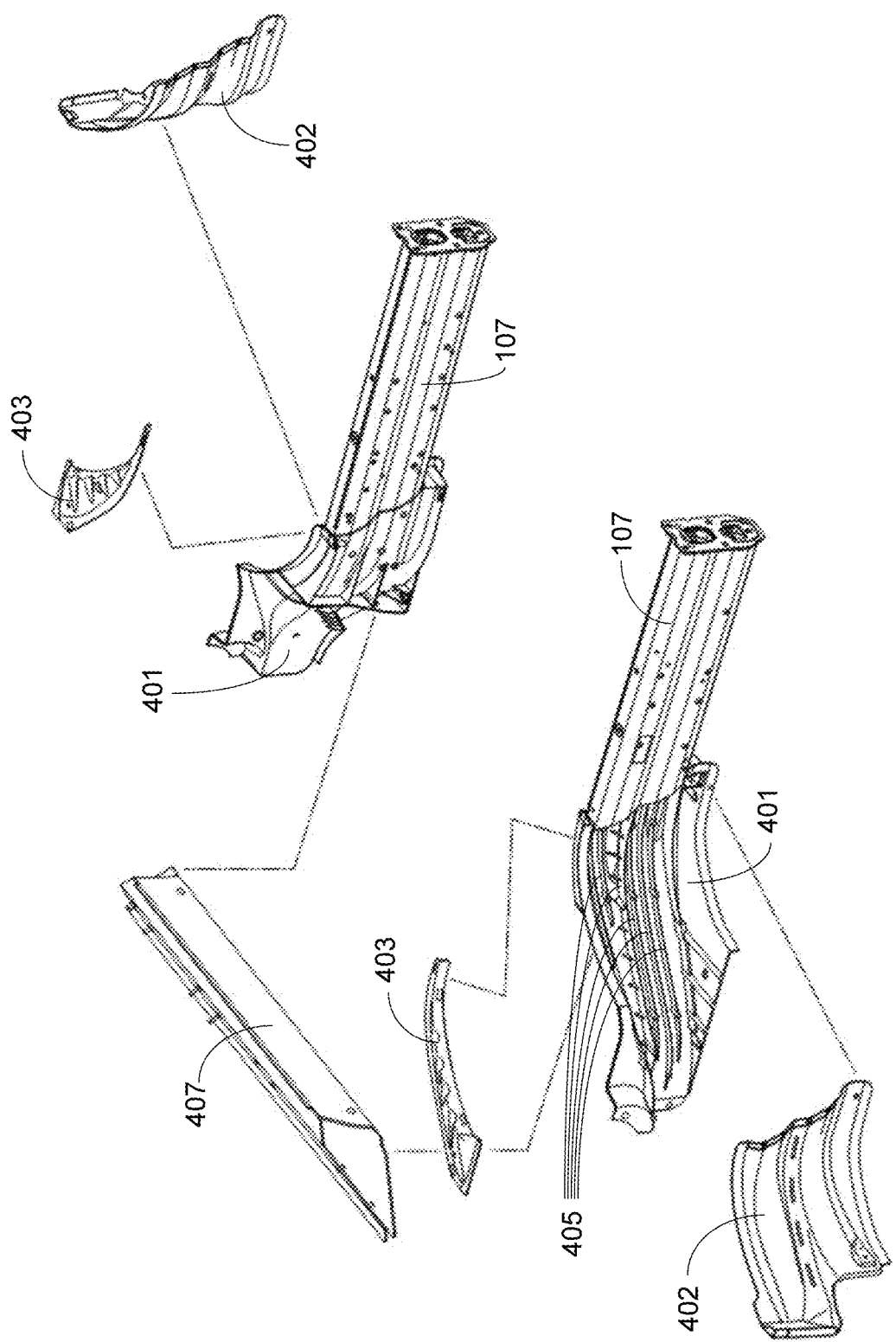
FIG. 4 provides a detailed, perspective view of the front rail/torque box assembly shown in FIG. 3.

FIGS. 3 and 4 provide detailed views of the mechanical coupling of front rails 107 to side sills 105, also referred to herein as rocker panels or simply as rockers. In the preferred embodiment, each torque box 109 is comprised of three members 401-403 that are assembled using MIG welding, either alone or in combination with rivets. Primary torque box member 401 is heavily ribbed as illustrated (see, for example, ribs 405). Preferably primary torque box member 401, and more preferably all three members 401-403, are fabricated from aluminum, for example using a high pressure die casting technique, although other materials (e.g., aluminum alloy, steel, etc.) and fabrication techniques may be used. Members 402 and 403, while coupled to the primary torque box member 401, are actually outer and inner rail extensions, respectively. Also shown in FIG. 4 is a cross-member 407 (also referred to herein as a toe board) that is welded between, and to, the pair of front torque boxes 109. Further details regarding the preferred embodiment of the front vehicle assembly, including front torque boxes 109, is provided in co-pending and co-assigned U.S. patent application Ser. No. 13/337,076, filed 24 Dec. 2011, published in U.S. Patent Application Publication No. US 2012/0175916 A1 on 12 Jul. 2012, the disclosure of which is incorporated herein by reference for any and all purposes.

Figure 5:
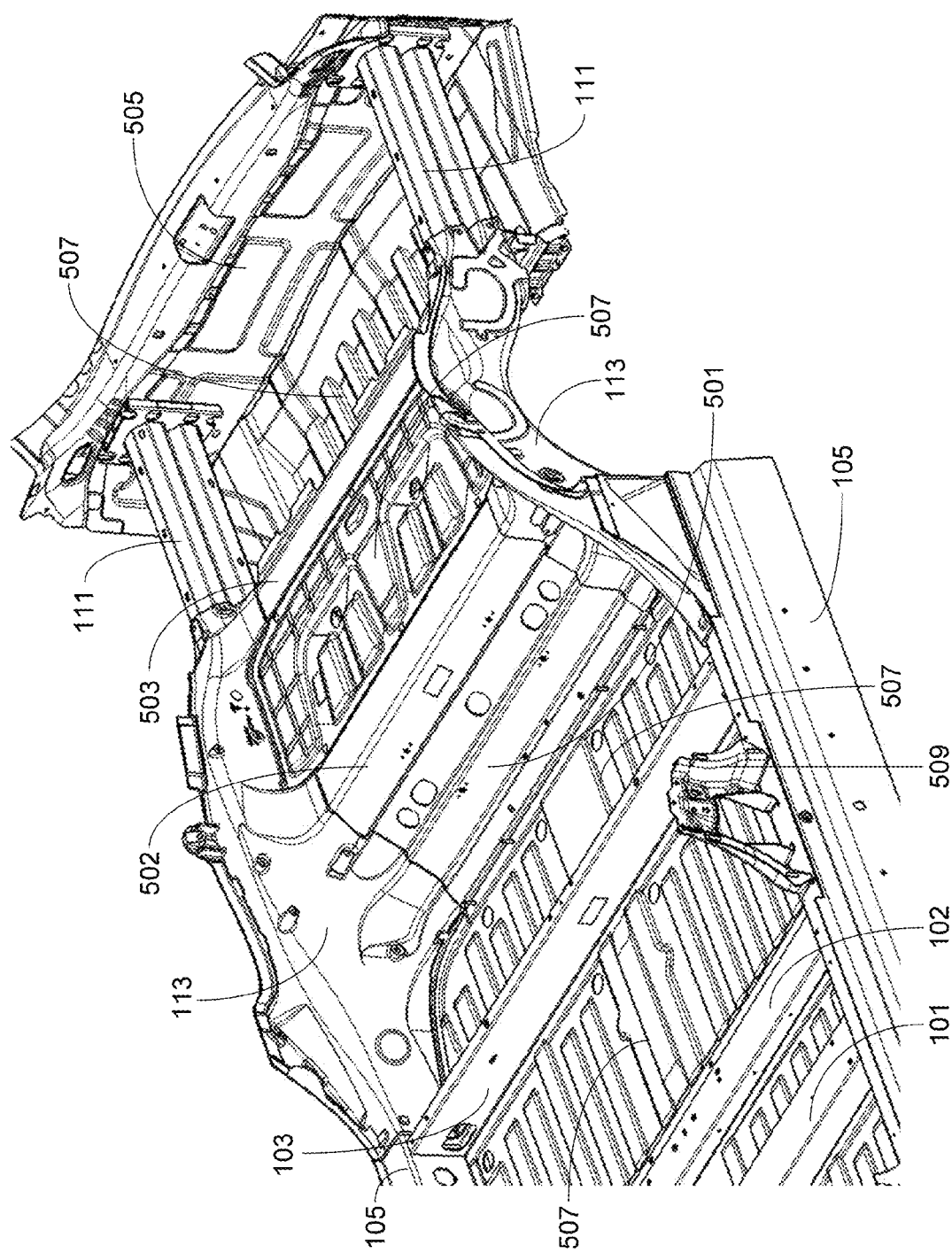
FIG. 5 provides a perspective view of the primary components of the rear section of an exemplary vehicle.
Figure 6:
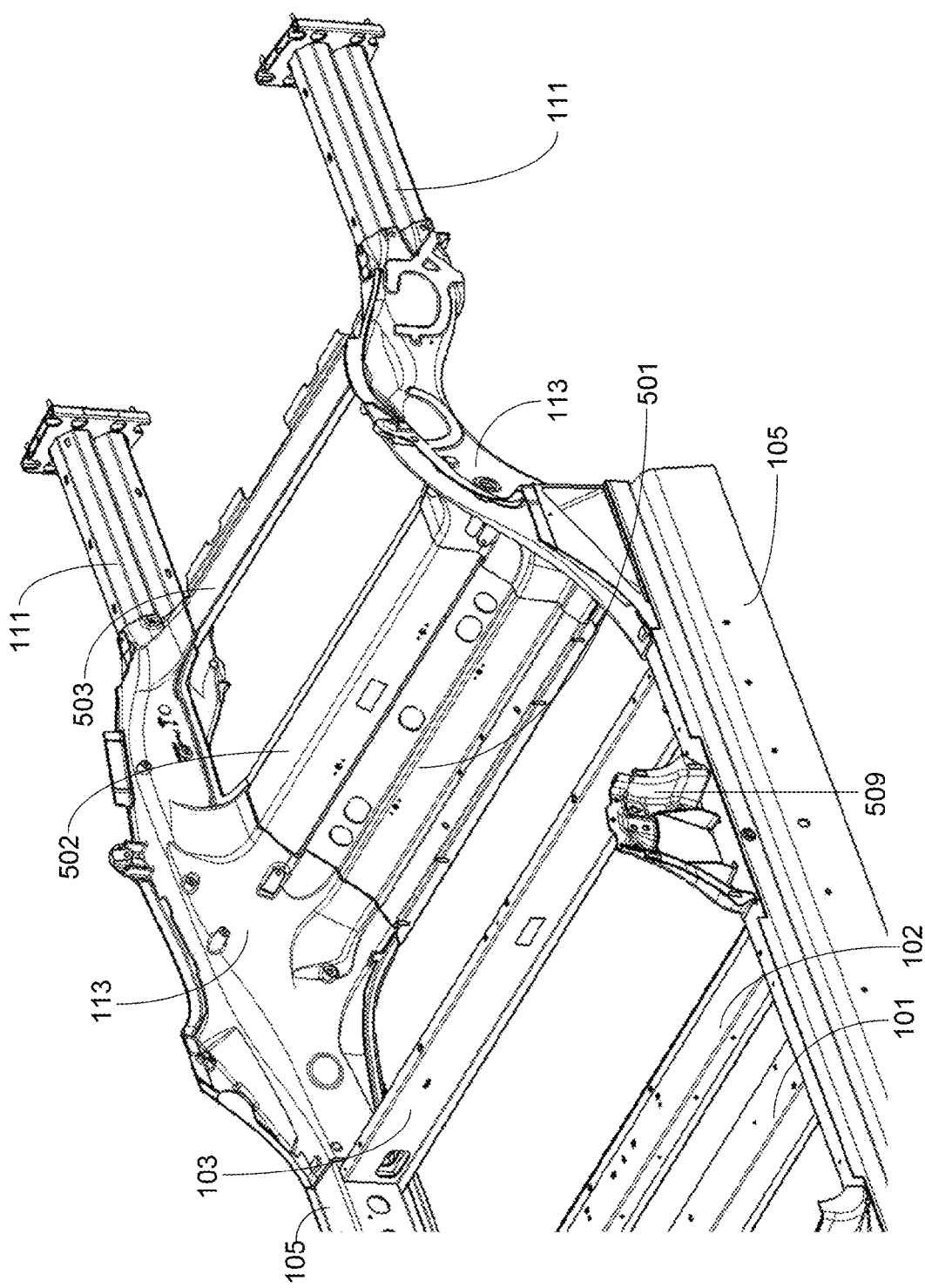
FIG. 6 provides a simplified view of the assembly shown in FIG. 5, this view eliminating the rear and bottom panels.

FIG. 5 provides a perspective view of the primary components of the rear section of an exemplary vehicle, e.g., vehicle under body 100. In this view, rear torque boxes 113 are visible, the torque boxes being coupled to rocker panels 105, multiple cross-members 501-503, and rear rails 111. Several body cross-members 101-103 are also visible as are the rear vehicle panels 505. Multiple floor panels 507 are visible as is one of the B-pillar mounts 509. Further details regarding the preferred embodiment of the middle vehicle assembly, including B-pillar mounts 509, is provided in co-pending and co-assigned U.S. patent application Ser. No. 13/308,408, filed 30 Nov. 2011, published in U.S. Patent Application Publication No. US 2012/0153675 A1 on 21 Jun. 2012, the disclosure of which is incorporated herein by reference for any and all purposes. FIG. 6 provides the same view of the vehicle as that of FIG. 5, except that several components have been removed to simplify the figure. Specifically, in FIG. 6 the rear and bottom panels 505 and 507, respectively, have been eliminated from view.

Figure 7:
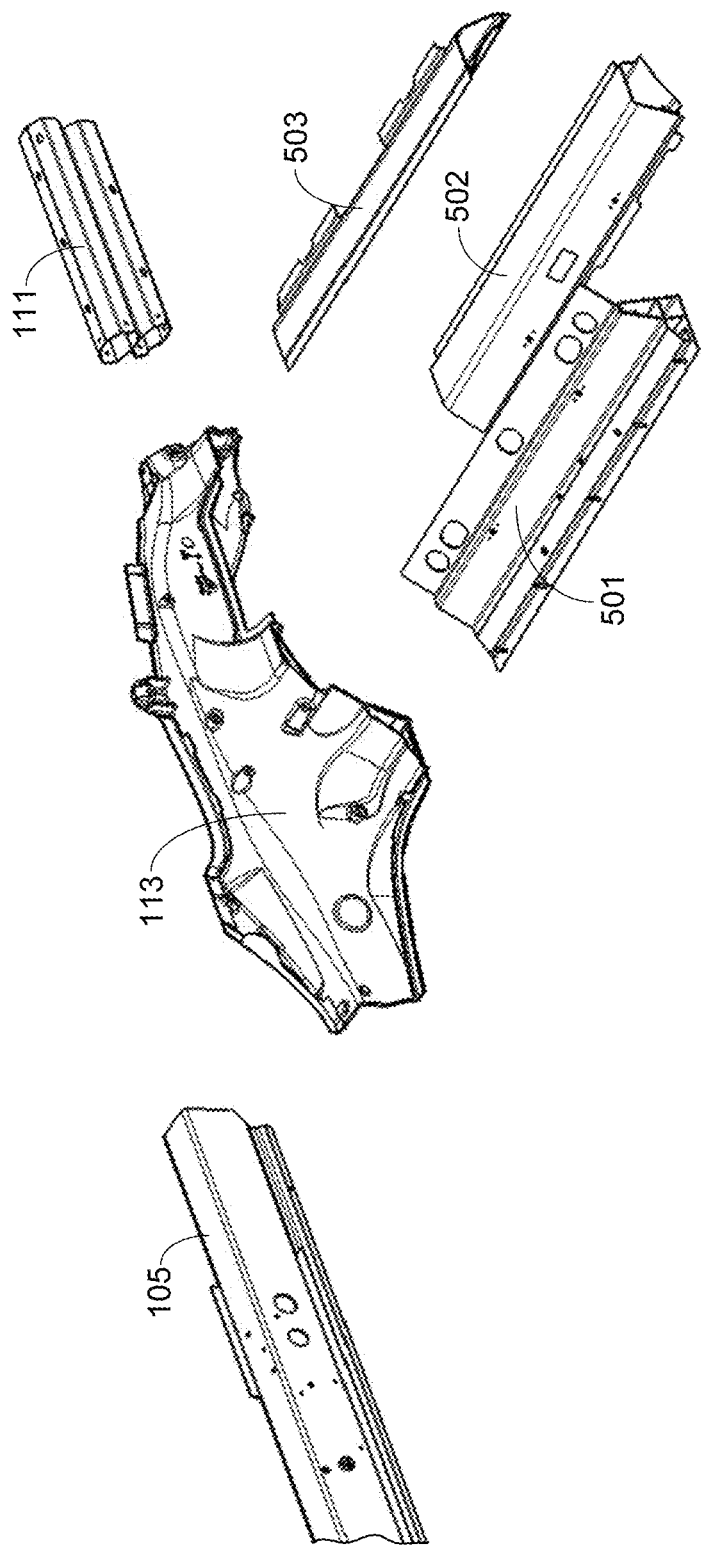
FIG. 7 provides a perspective, exploded view of the rear torque box and the primary structural elements that are coupled to the rear torque box.

FIG. 7 provides an exploded view of the single piece torque box 113 and those vehicle structural elements that are mechanically coupled to the torque box. As shown and as noted above, torque box 113 is mechanically coupled to side sill 105 along with cross-members 501-503 and rear rails 111. Preferably the vehicle's rear torque boxes 113, side sills 105, cross-members 501-503 and rear rails 111 are each fabricated from aluminum or an aluminum alloy, although other materials (e.g., steel) may be used for some or all of these components. Preferably sill 105, cross-members 501-503 and rear rail 111 are each welded to the single piece torque box. Further details regarding the preferred embodiment of the rear vehicle assembly, including rear torque boxes 113, is provided in co-pending and co-assigned U.S. patent application Ser. No. 13/341,615, filed 30 Dec. 2011, published in U.S. Patent Application Publication No. US 2012/0169089 A1 on 5 Jul. 2012, the disclosure of which is incorporated herein by reference for any and all purposes.

Figure 8:
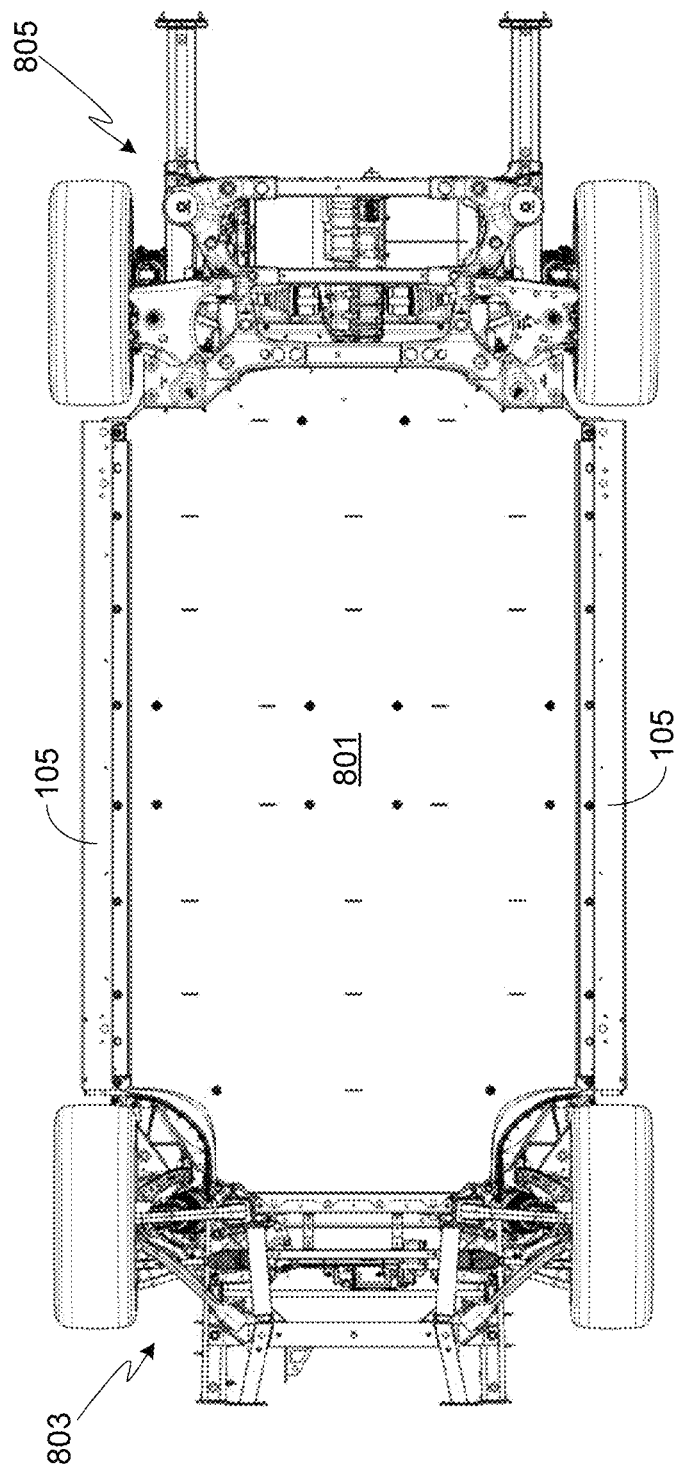
FIG. 8 provides a simplified bottom view of an exemplary electric vehicle with a battery pack incorporated into the vehicle structure.
Figure 9:
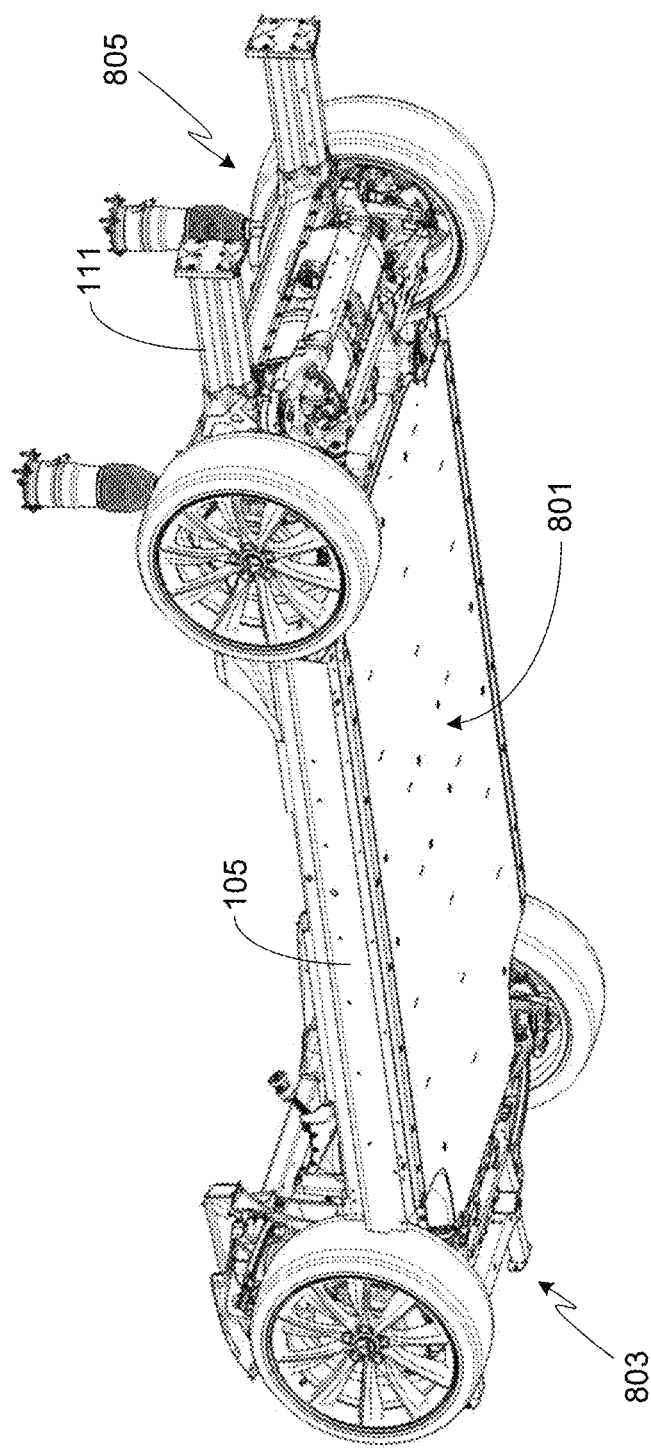
FIG. 9 provides a perspective view of a vehicle's undercarriage with the battery pack incorporated into the vehicle structure.
Figure 10:
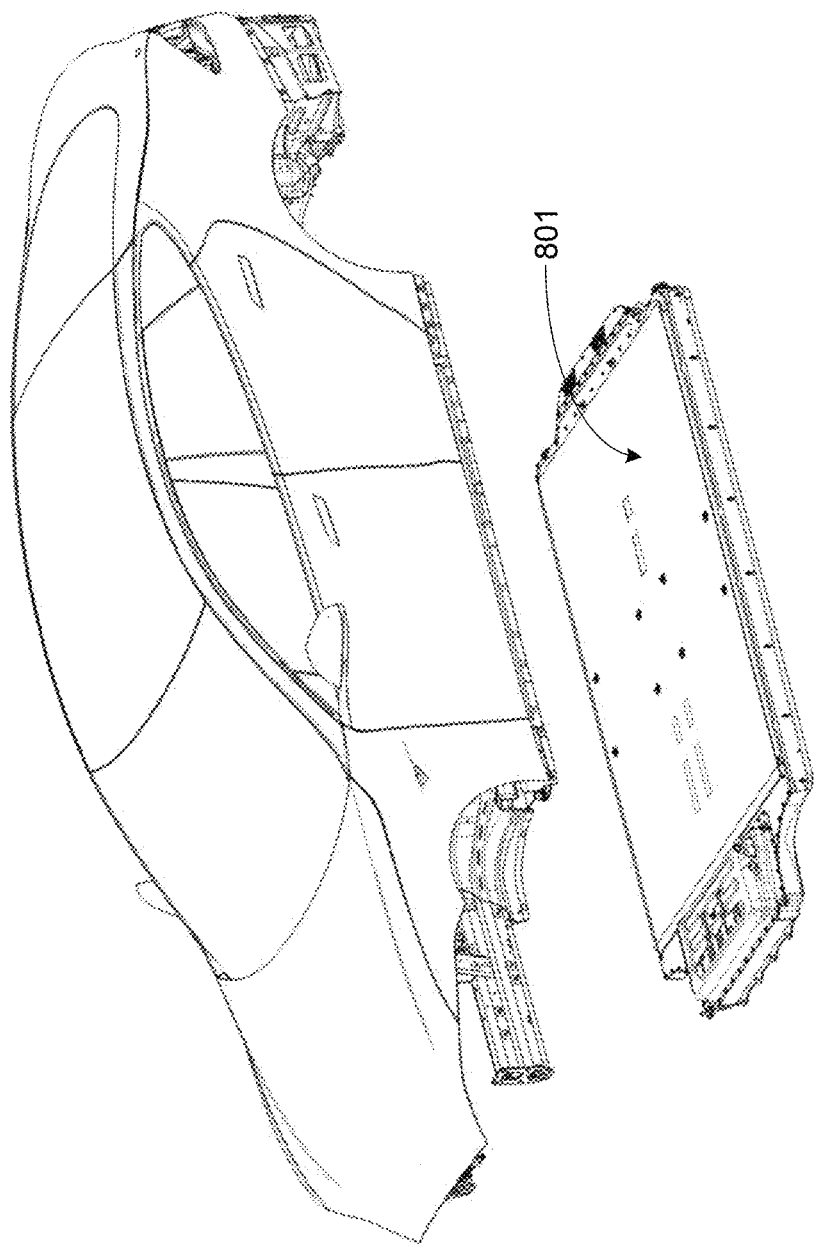
FIG. 10 provides a perspective view of a portion of a vehicle body and frame with the battery pack separated from the structure.

As noted above and as illustrated in FIGS. 8-10, in the exemplary embodiment a battery pack 801 is integrated into the vehicle's structure. Battery pack 801 not only transverses the width of the vehicle, i.e., from rocker panel to rocker panel, but also extends most of the distance between the front suspension 803 and the rear suspension 805. It will be appreciated that while smaller battery packs may be used, they may not provide the same level of side impact protection, depending upon their size and the number of integrated cross-members. In the illustrated embodiment, battery pack 801 is approximately 2.7 meters long and 1.5 meters wide. The thickness of battery pack 801 varies from approximately 0.1 meters to 0.18 meters, the thicker dimension applicable to those portions of the battery pack in which battery modules are positioned one on top of another, as described further below.

Figure 11:
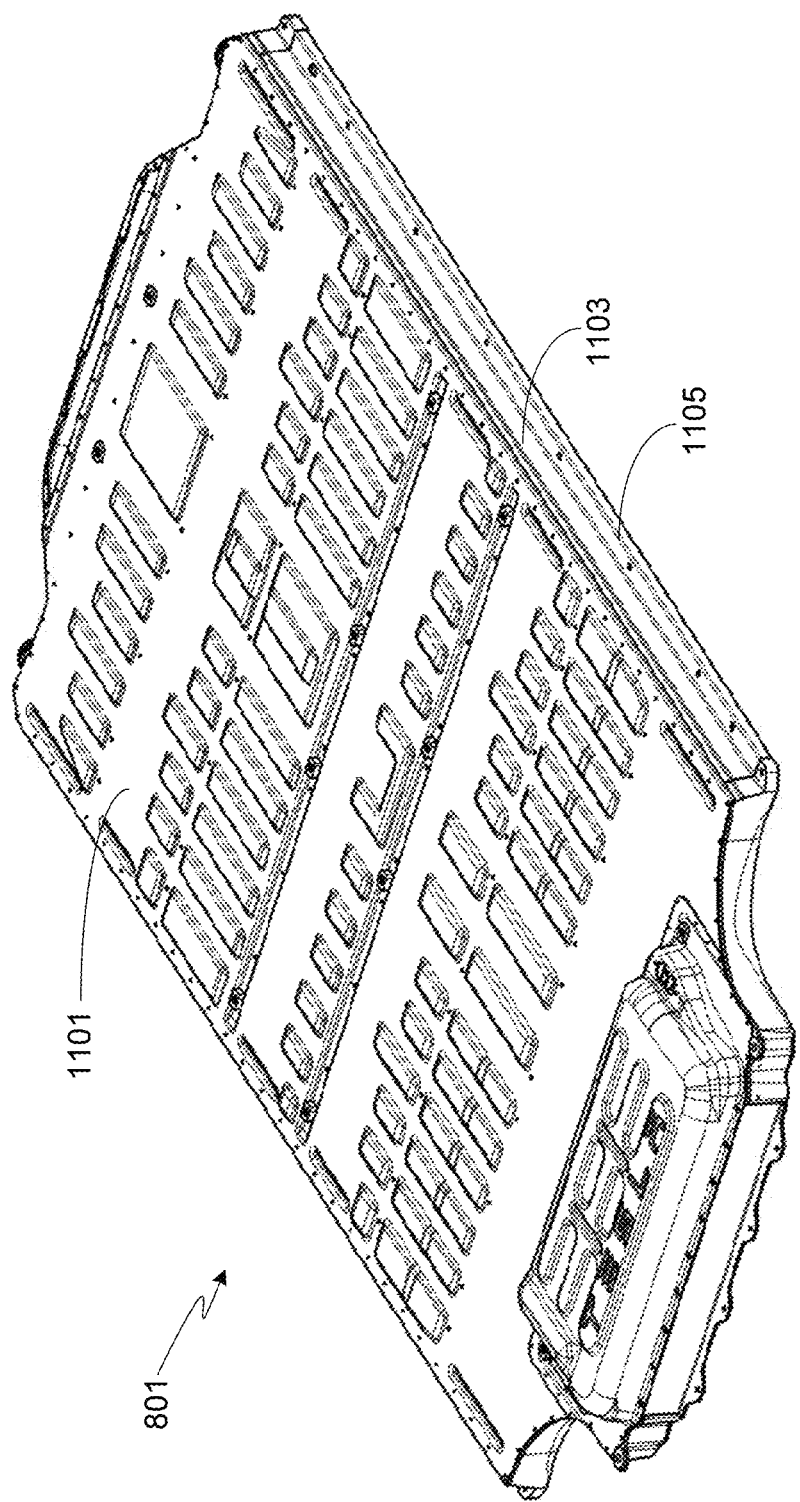
FIG. 11 provides a perspective view of the battery pack shown in FIGS. 8-10.
Figure 12:
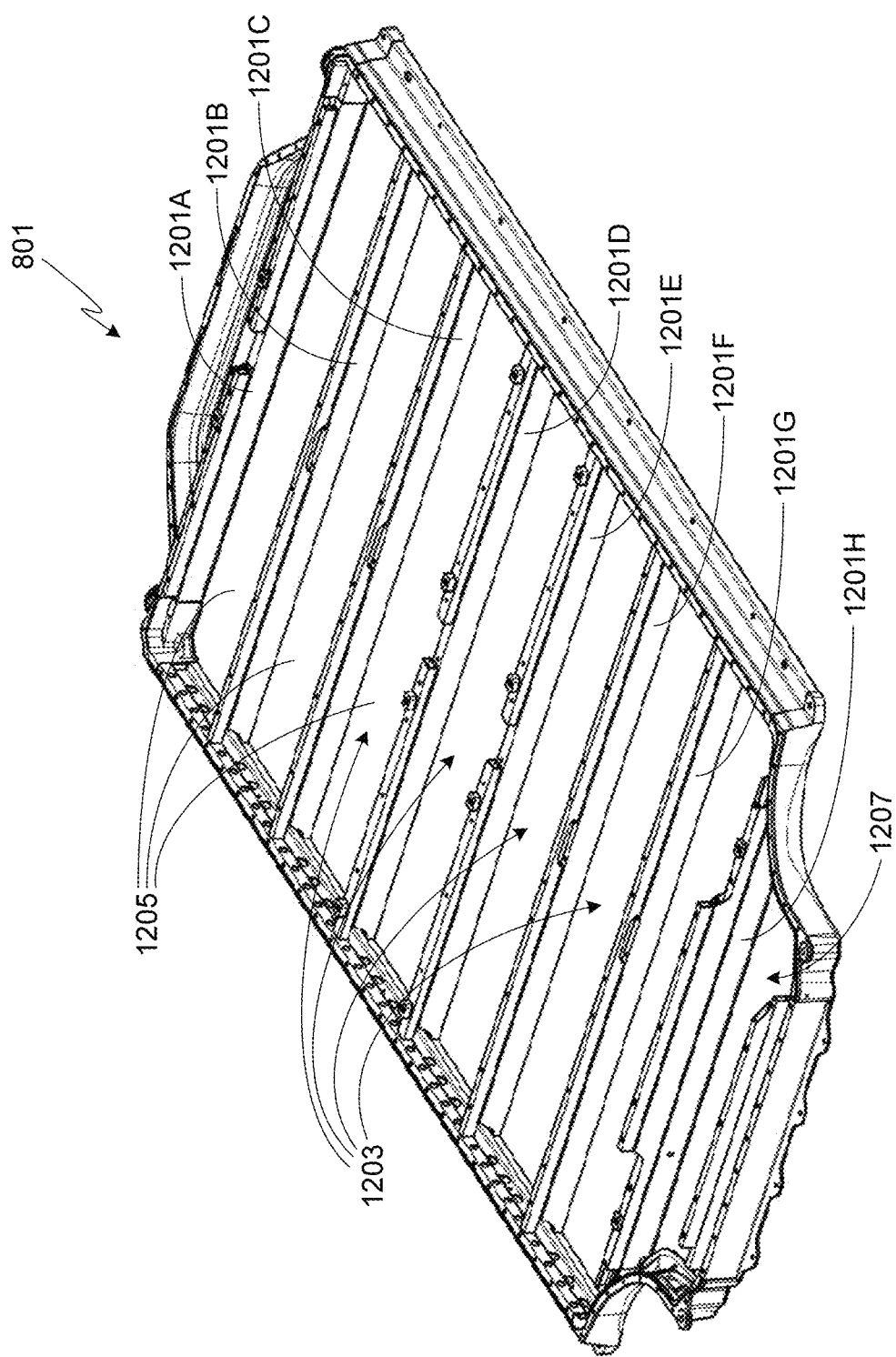
FIG. 12 provides a perspective view of the battery pack shown in FIGS. 8-11, with the top panel removed.

FIG. 11 provides a perspective view of battery pack 801 with the top enclosure panel 1101 in place, panel 1101 preferably providing a substantially airtight seal. Hollow side structural elements 1103 are also visible, members 1103 preferably including an extended region or lip 1105 that is used to mechanically and thermally couple the side members 1103 to the vehicle structure (not shown in this figure). FIG. 12 shows battery pack 801 with top member 1101 removed, this view showing cross-members 1201A-1201H. The number of cross-members is based on the number of cells/cell modules that are to be encased within the battery pack as well as the desired structural characteristics of the battery pack. Preferably battery pack side members 1103, including extended region 1105, battery pack top panel 1101 and battery pack bottom panel 1205 are each fabricated from a light weight metal, such as aluminum or an aluminum alloy, although other materials such as steel may be used for some or all of the battery pack components. Bottom panel 1205 may be welded, brazed, soldered, bonded or otherwise attached to side members 1103, with the resultant joint between panel 1205 and member 1103 preferably being substantially air-tight as well as being strong enough to allow bottom panel 1205 to support the batteries contained within the pack. Top panel 1101 is typically attached to member 1103 using bolts or similar means, thus simplifying battery replacement as well as allowing battery interconnects, battery pack components, cooling system components and other battery pack components to be repaired and/or replaced.

Cross-members 1201A-1201H provide several benefits. First and foremost, members 1201A-1201H provide mechanical and structural strength and rigidity to the battery pack and to the vehicle to which the battery pack is attached. Additionally, cross-members 1201A-1201H help to segregate thermal events by providing a thermal barrier between groups of cells as well as minimizing gas flow between sections 1203, sections 1203 being defined by the cross-members, side members 1103, top member 1101 and bottom member 1205. By segregating thermal events within smaller groups of cells, thermal runaway propagation is limited as is the potential for battery pack damage.

Figure 13:
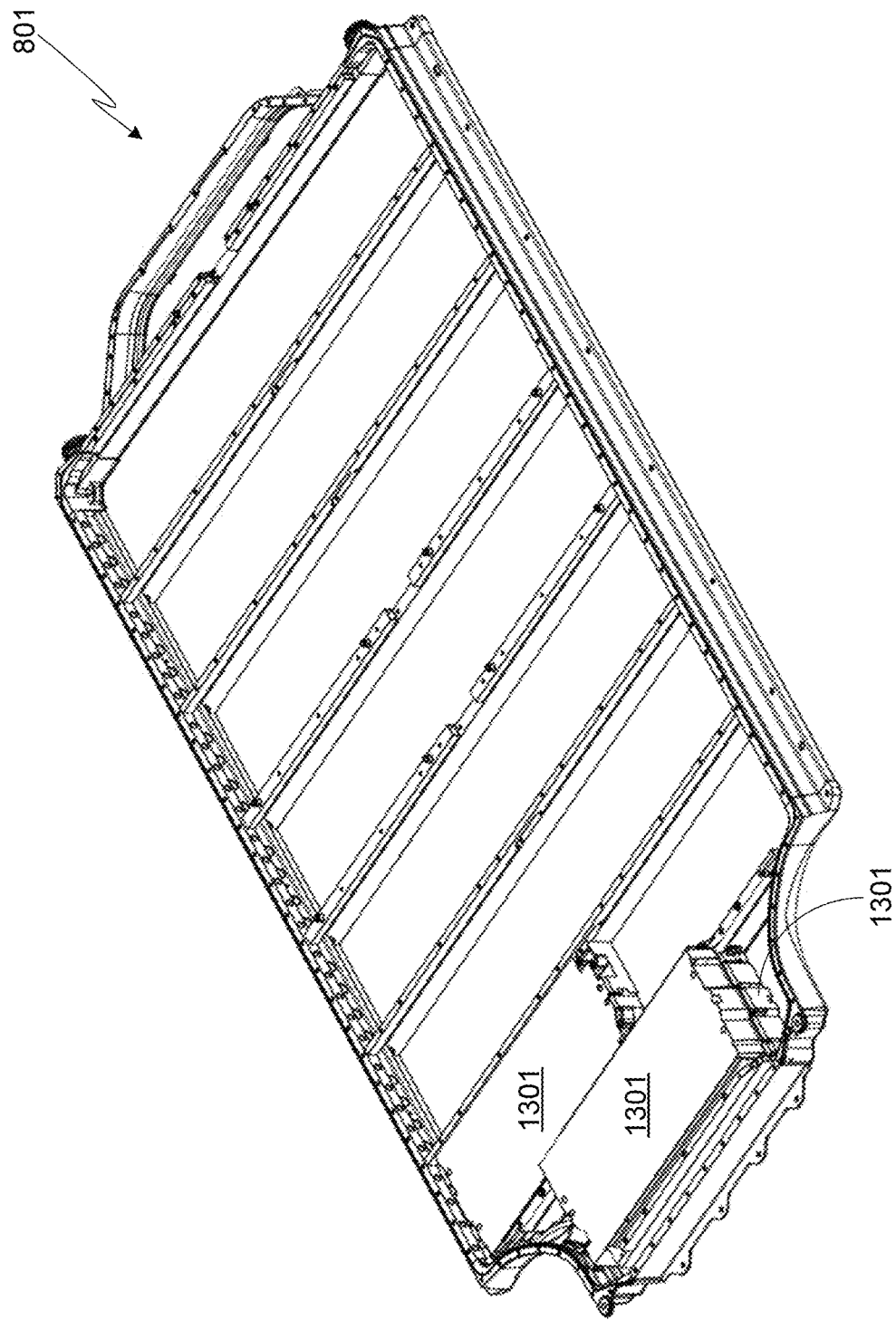
FIG. 13 provides a perspective view of the battery pack shown in FIGS. 8-12, this view showing three of the battery modules in place within the pack.

FIG. 13 shows a similar view to that provided by FIG. 12, with the inclusion of a couple of cell modules 1301. In this illustration, a single module 1301 is shown positioned within one of the seven, larger sections 1203 of battery pack 801. Note that each large section 1203 is designed to house a pair of battery pack modules 1301. Additionally, in this illustration there are two modules 1301 stacked one on top of the other in the front section 1207 of pack 801. Note that in the preferred embodiment, each module 1301 contains 370 individual cells, each cell utilizing an 18650 form factor. It should be understood, however, that this configuration is only an exemplary configuration and that the invention is equally applicable to other configurations, for example utilizing batteries with a different form factor, a larger or smaller number of cells, individual cells versus modules, etc.

Figure 14:
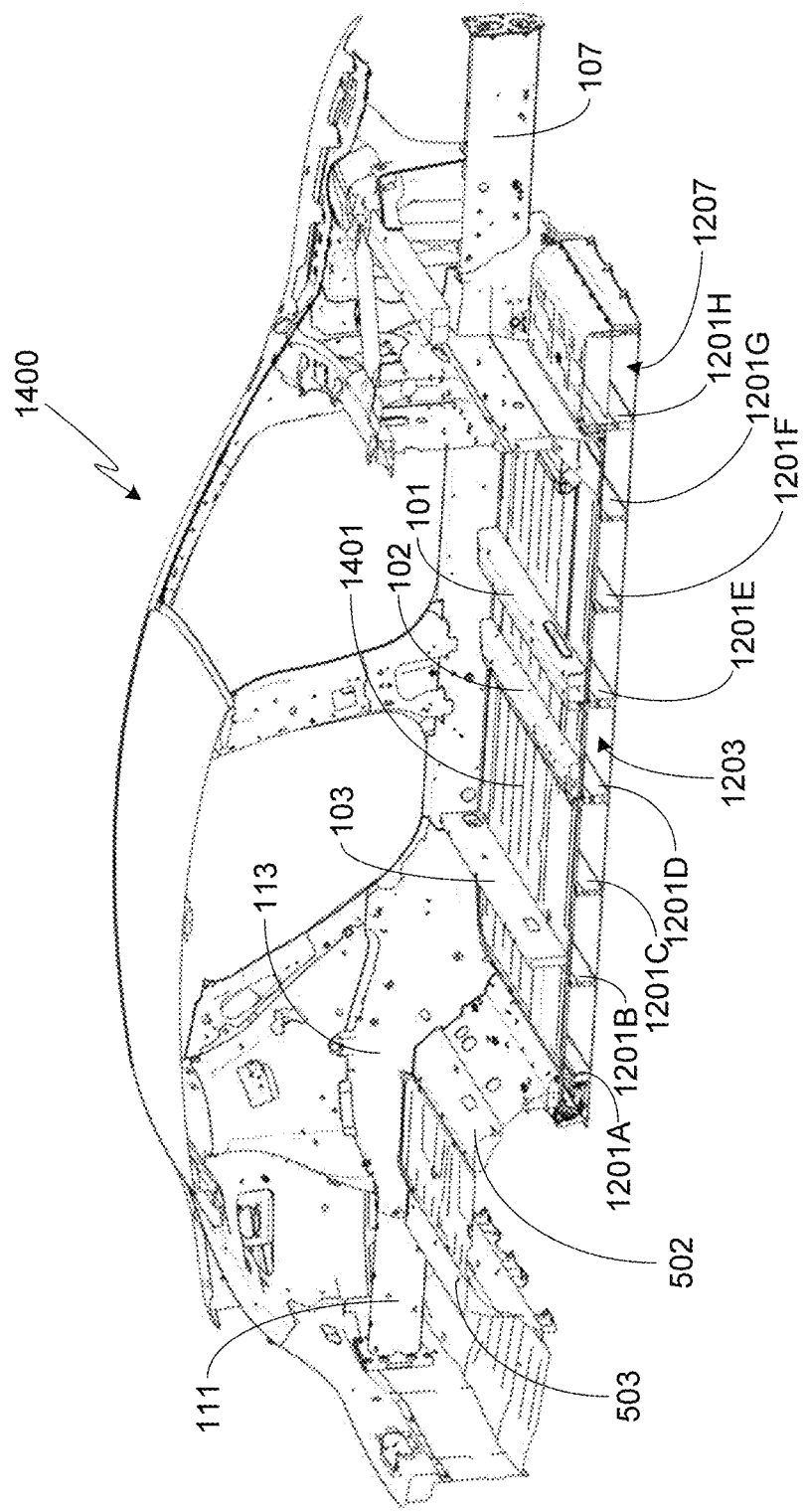
FIG. 14 provides a perspective, cross-sectional view of the battery pack shown in FIGS. 8-13 mounted under the floor panel of the vehicle shown in FIG. 10.

FIG. 14 provides a perspective, cross-sectional view of battery pack 801 mounted under floor panel 1401 of vehicle 1400. This view also provides additional views of the cross-members, both cross-members 1201A-1201H within the battery pack 801 and the body cross-members 101-103. Note that in this figure the batteries/battery modules are not shown within the battery pack, thus simplifying the figure in order to better illustrate the basic battery pack/vehicle assembly and configuration.

As shown by the cross-sectional view of FIG. 14, in the preferred embodiment cross-members 1201A-1201H do not utilize the same cross-section; rather the cross-section of each is optimized for each member's location within the pack. In general, cross-members 1201A-1201H may either be comprised of a single unit or, as preferred and illustrated, comprised of an upper member and a lower member. One or both members may be hollow, thus achieving the desired rigidity and strength while minimizing weight. It should be understood that not only can the configuration/design of the cross-members vary, depending upon their location within the pack, so can the materials comprising the cross-members. Therefore while cross-members 1201A-1201H are preferably fabricated from aluminum or an aluminum alloy, for example using an extrusion process, other materials (e.g., steel, ceramics, etc.) may also be used if such materials fit both the mechanical and thermal goals for the particular cross-member in question. Additionally, the lumens within one or more of the cross-members may be unfilled or filled with a high melting temperature, low thermal conductivity material (e.g., fiberglass or similar materials). Alternately, the lumens within the cross-members may include a liquid (e.g., water), the liquid being either stagnant or flowing. If stagnant, the liquid may be contained within the lumens themselves or, as preferred, contained within pouches that fit within the cavities. If the liquid is flowing, it is preferably contained within tubing that is inserted within the cross-member cavities and either coupled to a battery cooling system or used in a stand-alone circulation system.

In the preferred embodiment, and as illustrated in FIG. 14, battery pack cross-members 1201D and 1201E within the central region of the pack are larger than the other cross-members. The reason for the increased size for these particular cross-members is to provide additional cross-member strength at those locations that are preferably used for seat mounting assemblies and aid in resisting the side impact loads that may be encountered during a collision.

Figure 15:
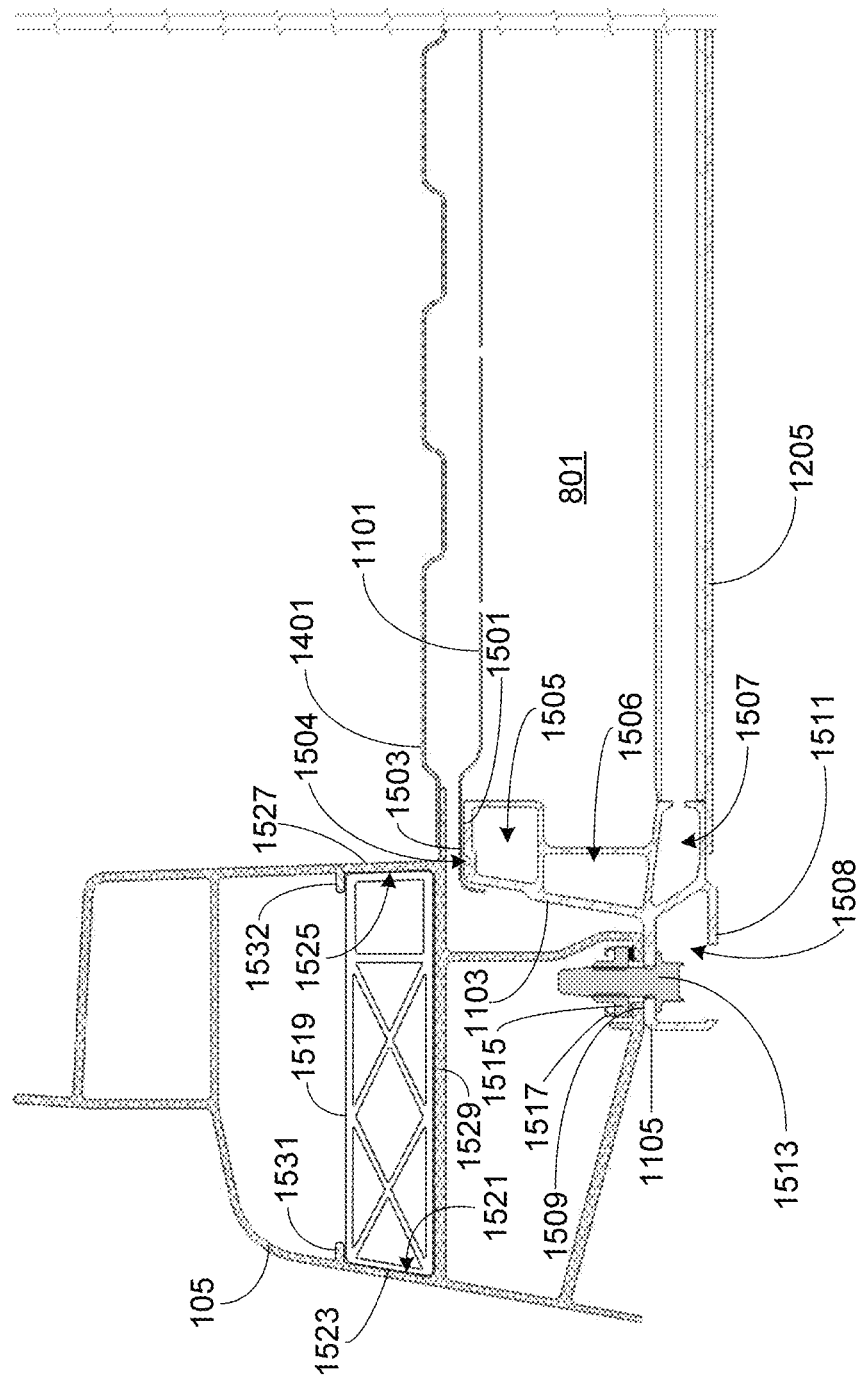
FIG. 15 provides a cross-sectional view of the sill and sill insert assembly along with a portion of the battery pack.

FIG. 15 provides a cross-sectional view that illustrates the attachment of battery pack 801 to side sill 105. Preferably side sill 105 is extruded, for example using an aluminum or aluminum alloy extrusion as described in detail in co-pending and co-assigned U.S. patent application Ser. No. 13/308,206, filed 30 Nov. 2011 published in U.S. Patent Application Publication No. US 2012/0153682 A1 on 21 Jun. 2012, the disclosure of which is incorporated herein by reference for any and all purposes. Preferably a seal or gasket is located between the top surface 1501 of battery pack side members 1103 and the bottom surface 1503 of the battery pack top panel 1101, thus achieving a substantially air-tight seal. An o-ring groove 1504 is visible in FIG. 15 for use with such a seal. In the illustrated embodiment, each battery pack side member 1103 includes four lumens 1505-1508 although other embodiments may utilize a fewer or greater number of side member lumens. Lower exterior lumen 1508 is positioned under the extended region 1105 of battery pack side member 1103. Lumen 1508 is perforated on upper surface 1509 and lower surface 1511, the perforations on these two surfaces being aligned such that bolts 1513, or similar means, may pass completely through lumen 1508, thereby allowing bolts 1513 to couple extended region 1105 of battery pack side member 1103 to side sill 105 as shown. Bolts 1513 and channel nuts 1515 securely attach battery pack side members 1103, and therefore battery pack 801, to the vehicle structure. Preferably channel nuts 1515 are held in place during assembly using channel nut retainer 1517. In addition to providing a strong mechanical coupling, this approach allows battery pack 801 to be quickly and efficiently removed from underneath the vehicle.

Located within side sill 105 is an insert 1519. Insert 1519 extends between the inner surface 1521 of the outer side sill wall 1523 and the inner surface 1525 of the inner side sill wall 1527. Preferably insert 1519 is rectangularly-shaped and extends the entire length of, or substantially the entire length of, side sill 105 (i.e., along the longitudinal direction of the vehicle). In the preferred and illustrated embodiment, the sides of insert 1519 are captured between outer side sill wall 1523 and inner side sill wall 1527, while the lower and upper insert surfaces are captured between an inner side sill wall 1529 and a pair of insert guides 1531/1532, where each insert guide is comprised of a guide member that extends from the inner surfaces of the inner and outer sill walls, i.e., inner surface 1521 of outer sill wall 1523 and inner surface 1525 of inner sill wall 1527. It will be appreciated that other means may be used to locate insert 1519 within the rocker panel, e.g., guides for both the upper and lower insert surfaces.

In the preferred embodiment, insert 1519 is fabricated as a separate component from side sill 105 and preferably held in place with adhesives, rivets, spot welds, bolts, or other types of mechanical fasteners. By fabricating the insert separately from the side sill, it may be formed of a different material (e.g., different aluminum alloy or different material altogether), or receive a different post fabrication treatment (e.g., different heat treatment), thus allowing the material qualities of the insert to vary from those of the side sill. In at least one embodiment, however, the side sill and the collapsible energy absorbing element of the side sill, e.g., insert 1519, are fabricated as a single component, for example using an extrusion process.

Figure 16:
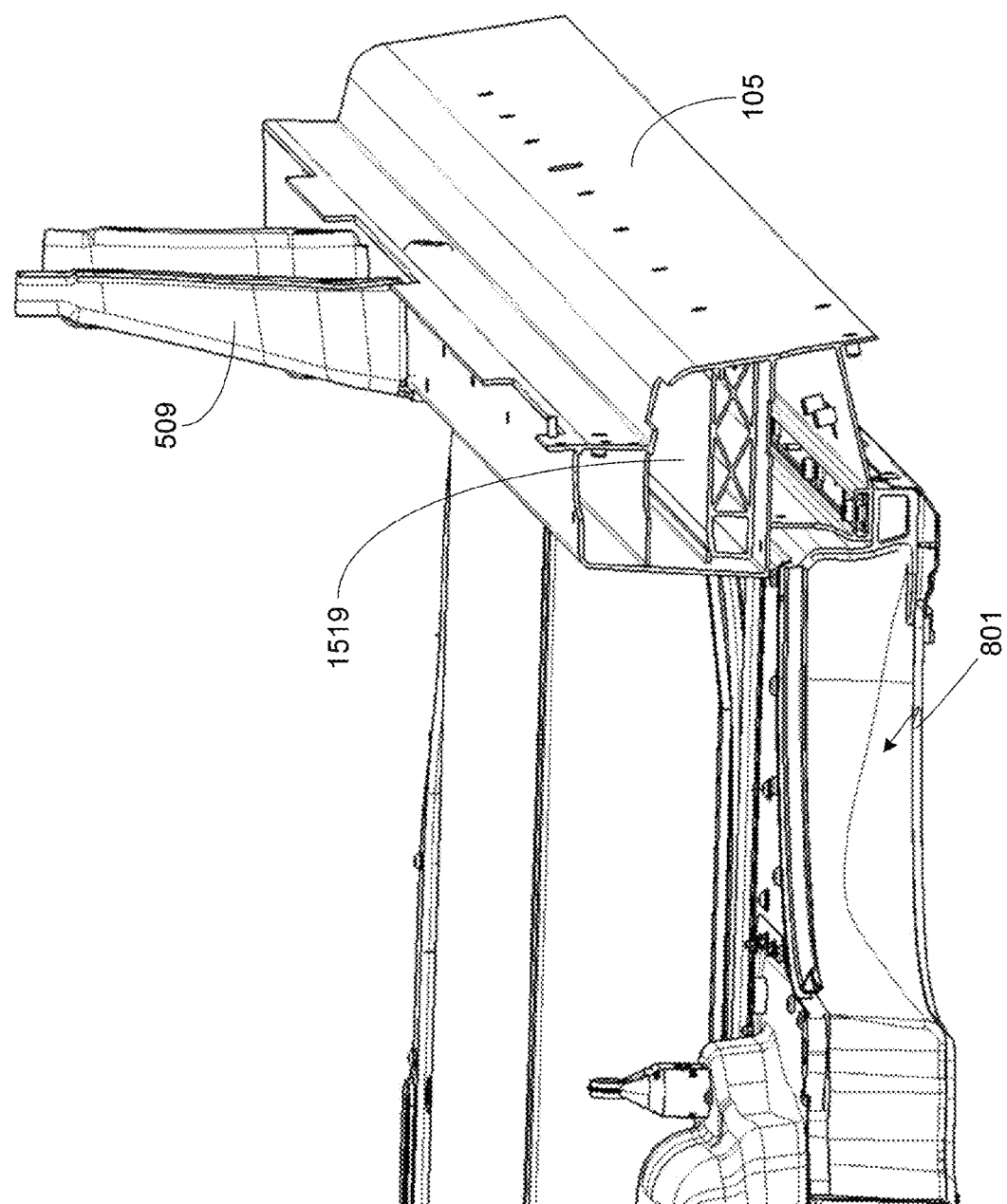
FIG. 16 provides a perspective cross-sectional view of the assembly shown in FIG. 15.

FIG. 16 provides a perspective view that illustrates the attachment of battery pack 801 to side sill 105, as well as the inclusion of energy absorbing insert 1519 within sill 105.

Figure 17:
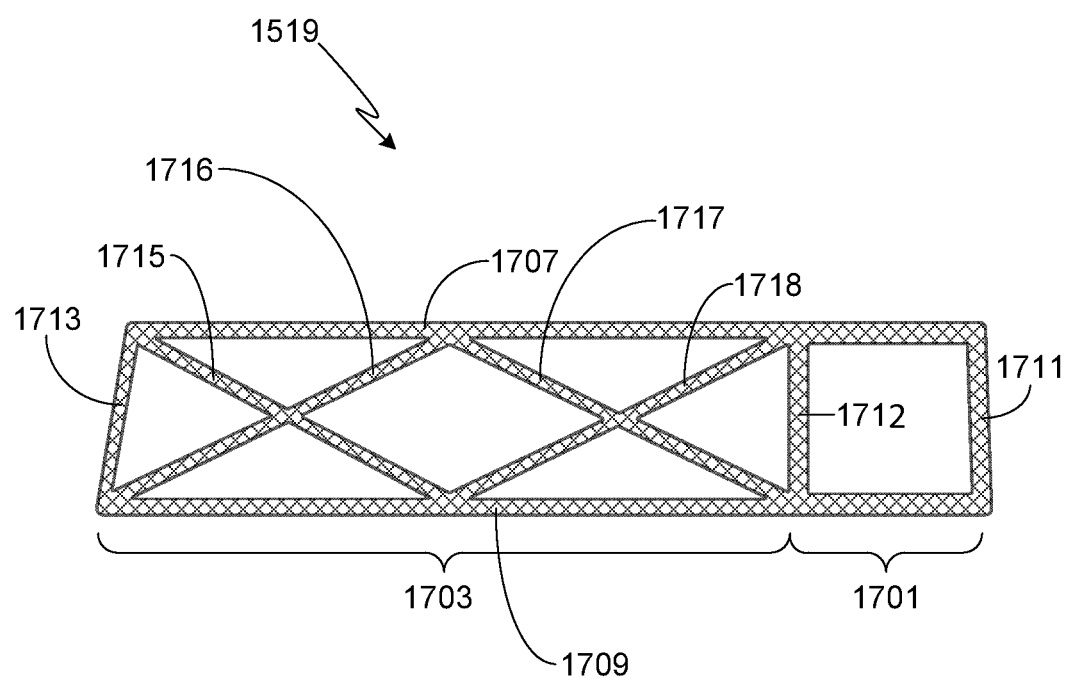
FIG. 17 provides a detailed cross-sectional of the energy absorbing sill insert.

FIG. 17 is a cross-sectional view of energy absorbing sill insert 1519. Preferably insert 1519 is formed from a 6xxx series aluminum alloy using an extrusion process, and subsequently strengthened using a heat treatment (i.e., precipitation hardening). Insert 1519 includes a reacting portion 1701 and a collapsible, energy absorbing portion 1703. Reacting portion 1701, which preferably has a substantially square cross-section, is defined by a portion of upper insert wall 1707, a portion of lower insert wall 1709, inner insert wall 1711, and a substantially vertical internal member 1712 that connects upper insert wall 1707 to lower insert wall 1709. In the preferred embodiment, the quadrangle formed by a portion of upper insert wall 1707, a portion of lower insert wall 1709, outer insert wall 1713 and internal member 1712 is designed to collapse and absorb side impact energy during the deformation process while reacting portion 1701 is designed to distribute that energy along the sill assembly and through to the vehicle cross-members (e.g., members 101-103 and the front/rear torque box assemblies). In the illustrated insert, the collapsible, energy absorbing portion 1703 contains two pairs of diagonal structural members, each pair being formed as an "X". Thus the first pair is formed by diagonal, crossing members 1715/1716 and the second pair is formed by diagonal, crossing members 1717/1718. In order to promote the collapse of portion 1703 while utilizing portion 1701 to distribute impact energy, the thickness of each wall comprising portion 1701 may be greater than the thickness of each wall comprising portion 1703, i.e., the thickness of walls 1711, 1712 and those portions of walls 1707 and 1709 comprising portion 1701 is preferably greater than the thickness of walls 1713, 1715, 1716, 1717, 1718 and those portions of walls 1707 and 1709 comprising portion 1703.

Figure 18:
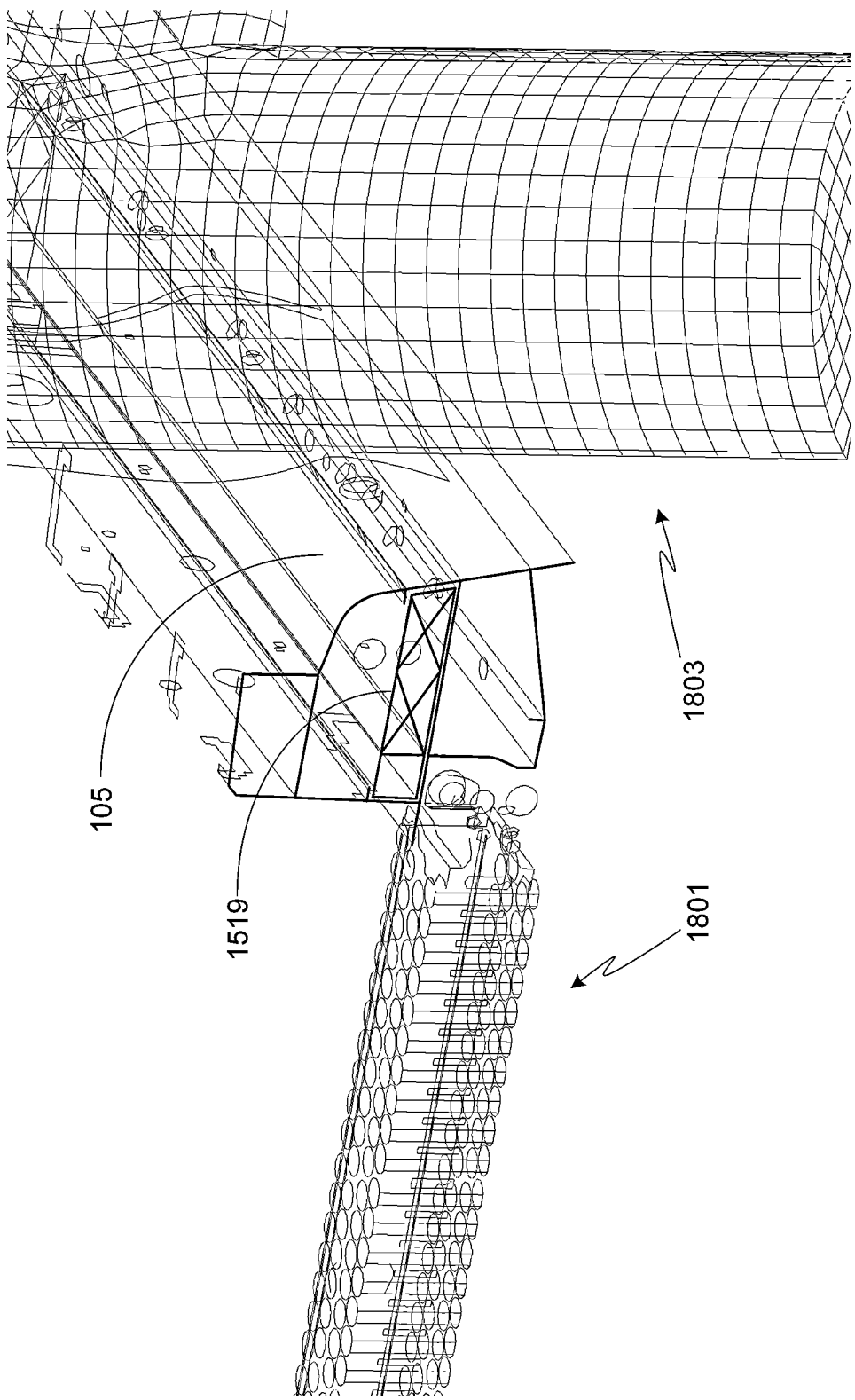
FIG. 18 provides a pre-impact view of the sill assembly of the invention prior to being impacted by a cylindrical object.
Figure 19:
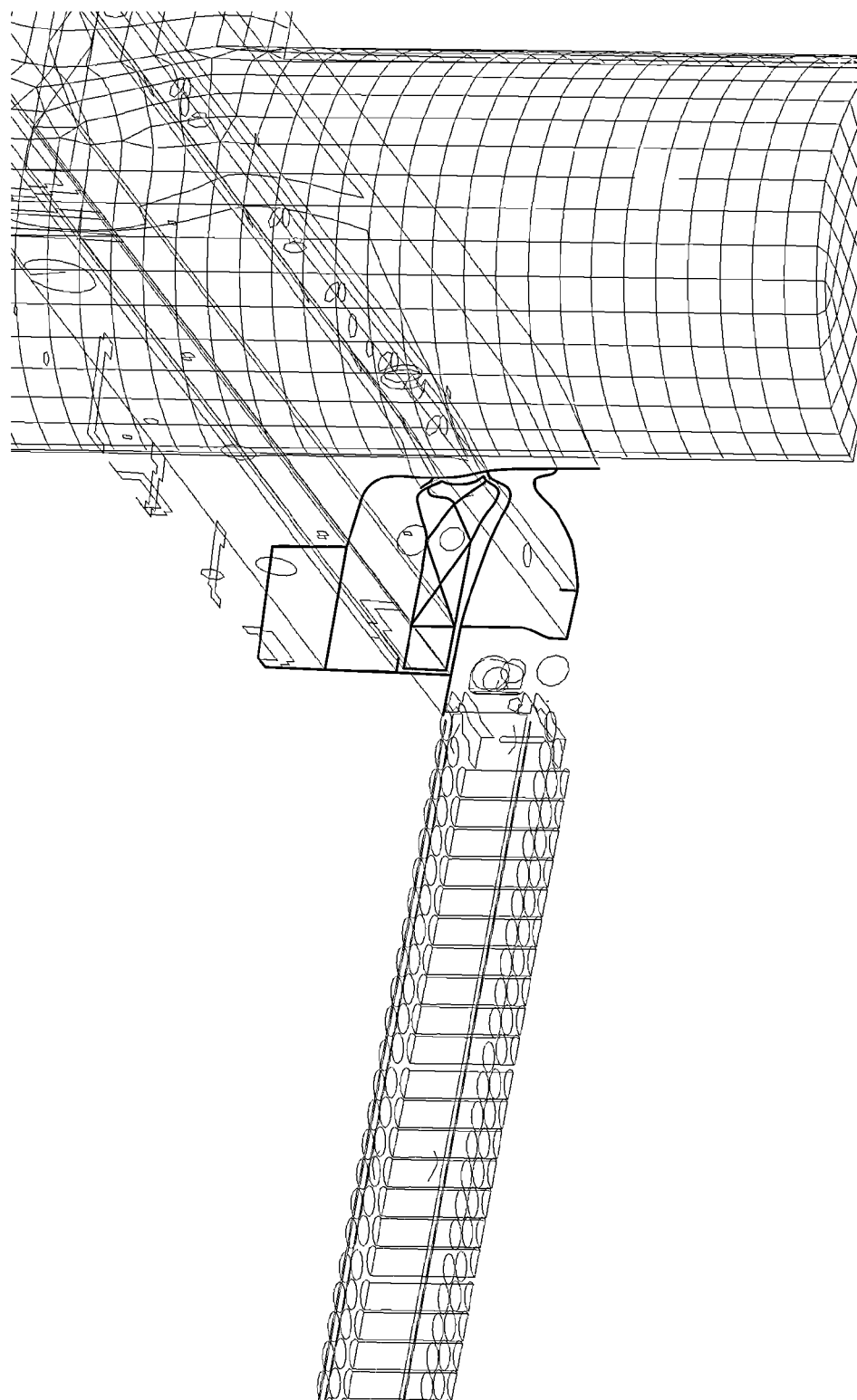
FIG. 19 provides a view similar to that of FIG. 18 illustrating the effects on the sill assembly after the initial impact of the cylindrical object.
Figure 20:
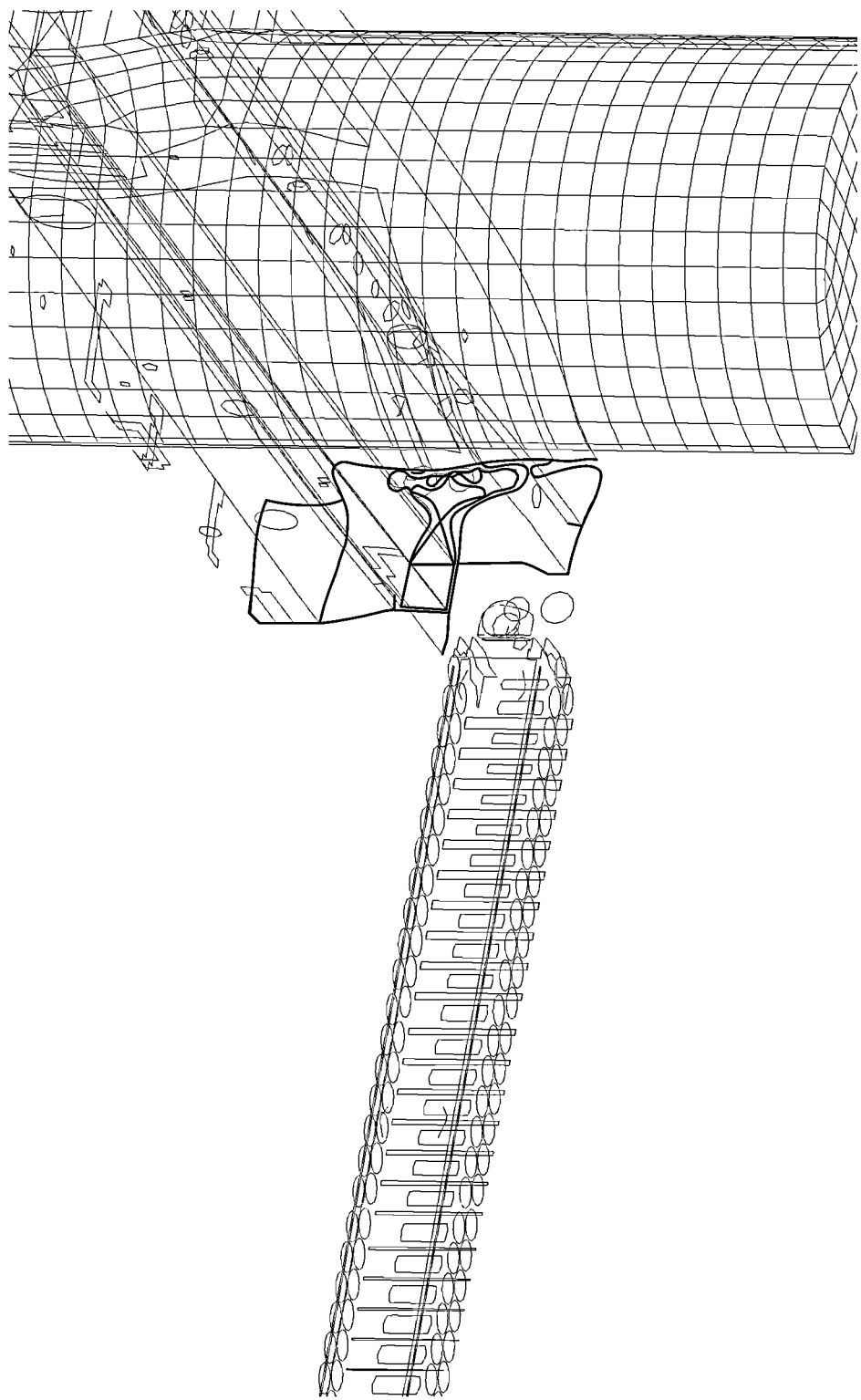
FIG. 20 provides a view similar to that of FIGS. 18 and 19 after the force of impact has caused further deformation of the sill assembly.
Figure 21:
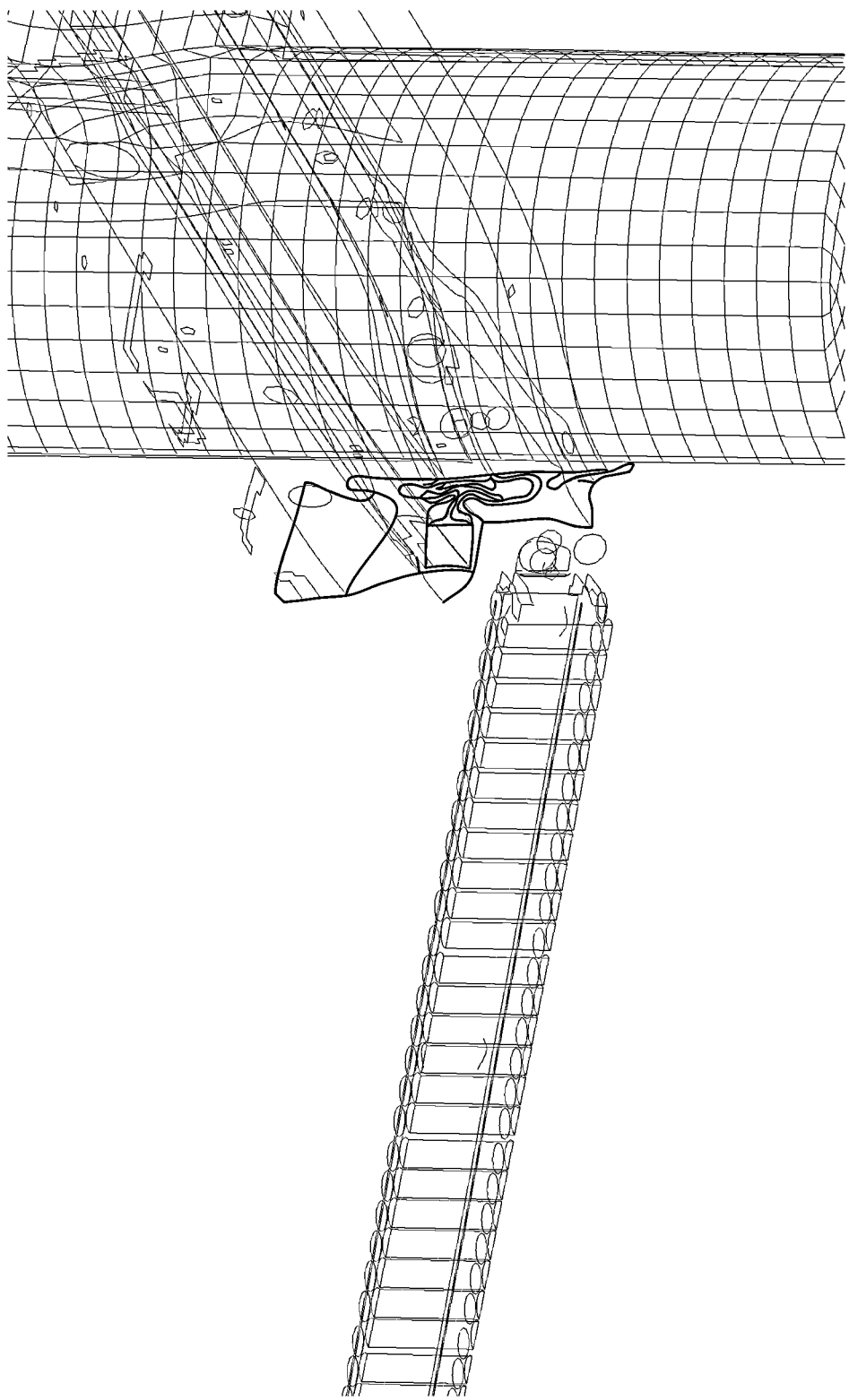
FIG. 21 provides a view similar to that of FIGS. 18-20 illustrating the effects of the side impact on the sill assembly after conclusion of the impact.

FIGS. 18-21 illustrate the effects of the impact of a cylindrical object, such as a pillar, on the sill assembly of the invention, these figures utilizing a simplified cross-sectional view of the assembly. FIG. 18 provides a pre-impact view of the previously described side sill 105 and insert 1519. A plurality of batteries 1801 are shown in this figure as well as a cylindrical object 1803. The outer edges of the sill assembly cross-section have been highlighted in these figures in order to more clearly show the effects of the impact. During the initial stage of impact, shown in FIG. 19, only the outermost region of collapsible portion 1703 deforms, this deformation process absorbing crash energy from the impact. Assuming that the impact has sufficient force, collapsible portion 1703 continues to deform and continues to absorb impact energy as shown in FIG. 20. Even if the impact force is sufficient to continue to drive pillar 1803 into the side of the vehicle as shown in FIG. 21, the configuration of insert 1519 allows collision energy that is not absorbed by the deformation process of the collapsible portion to be distributed by reacting portion 1701, thus helping to insure the safety of the vehicle's occupants as well as critical vehicle components such as the battery pack.

Systems and methods have been described in general terms as an aid to understanding details of the invention. In some instances, well-known structures, materials, and/or operations have not been specifically shown or described in detail to avoid obscuring aspects of the invention. In other instances, specific details have been given in order to provide a thorough understanding of the invention. One skilled in the relevant art will recognize that the invention may be embodied in other specific forms, for example to adapt to a particular system or apparatus or situation or material or component, without departing from the spirit or essential characteristics thereof. Therefore the disclosures and descriptions herein are intended to be illustrative, but not limiting, of the scope of the invention.

What is claimed is:

1. An energy absorbing and distributing side impact system for a vehicle, comprising:
    a pair of side sill assemblies, said pair of side sill assemblies comprising a left hand side sill assembly and a right hand side sill assembly, wherein each of said side sill assemblies further comprises a side sill insert, wherein said side sill insert is captured between an inner side sill wall and an outer side sill wall, wherein said side sill insert further comprises a reacting portion and a collapsible portion, wherein said reacting portion is adjacent to said inner side sill wall and wherein said collapsible portion is adjacent to said outer side sill wall;
    a plurality of vehicle cross-members interposed between said inner side sill walls of said left hand side sill assembly and said right hand side sill assembly, wherein each of said plurality of vehicle cross-members is mechanically coupled to said inner side sill walls of said left hand side sill assembly and said right hand side sill assembly; and
    wherein said side sill insert is captured between a substantially horizontal inner side sill wall and a pair of insert guide members, wherein a first insert guide member of said pair of insert guide members extends from an inner surface of said inner side sill wall, and wherein a second insert guide member of said pair of insert guide members extends from an inner surface of said outer side sill wall, and wherein said substantially horizontal inner side sill wall is interposed between and is coupled to said inner surface of said inner side sill wall and said inner surface of said outer side sill wall.

2. The energy absorbing and distributing side impact system of claim 1, wherein said side sill insert is held in place between said inner side sill wall and said outer side sill wall using a plurality of mechanical fasteners.

3. The energy absorbing and distributing side impact system of claim 2, wherein said plurality of mechanical fasteners are selected from the group consisting of rivets and bolts.

4. The energy absorbing and distributing side impact system of claim 1, wherein said side sill insert is held in place between said inner side sill wall and said outer side sill wall using a plurality of spot welds.

5. The energy absorbing and distributing side impact system of claim 1, wherein said side sill insert is held in place between said inner side sill wall and said outer side sill wall using an adhesive.

6. The energy absorbing and distributing side impact system of claim 1, further comprising:
    a pair of rear torque boxes, said pair of rear torque boxes comprising a left hand rear torque box mechanically coupled to said left hand side sill assembly and a right hand rear torque box mechanically coupled to said right hand side sill assembly; and
    a pair of front torque boxes, said pair of front torque boxes comprising a left hand front torque box mechanically coupled to said left hand side sill assembly and a right hand front torque box mechanically coupled to said right hand side sill assembly;
    wherein each of said side sill inserts has a rectangularly-shaped cross section, and wherein each of said sill inserts extends longitudinally within each of said side sill assemblies from a first side sill assembly end portion proximate to one of said pair of front torque boxes to a second side sill assembly end portion proximate to one of said pair of rear torque boxes.

7. The energy absorbing and distributing side impact system of claim 6, wherein each of said side sill inserts further comprises a vertical internal wall interposed between an upper sill insert wall and a lower sill insert wall, said vertical internal wall separating said reacting portion from said collapsible portion.

8. The energy absorbing and distributing side impact system of claim 7, wherein said reacting portion is substantially square-shaped.

9. The energy absorbing and distributing side impact system of claim 7, wherein said collapsible portion further comprises a pair of diagonal structural members, wherein said pair of diagonal structural members cross to form an x-shape, and wherein each diagonal structural member of said pair of diagonal structural members extends between said upper sill insert wall and said lower sill insert wall.

10. The energy absorbing and distributing side impact system of claim 7, wherein said collapsible portion further comprises a first pair of diagonal structural members and a second pair of diagonal structural members, wherein said first pair of diagonal structural members cross to form a first x-shape, wherein said second pair of diagonal structural members cross to form a second x-shape, and wherein each structural member of said first and second pair of diagonal structural members extends between said upper sill insert wall and said lower sill insert wall.

11. The energy absorbing and distributing side impact system of claim 10, wherein said first pair of diagonal structural members is configured to collapse and deform prior to said second pair of diagonal structural members during a side impact collision, wherein said first pair of diagonal structural members is closer to said outer side sill wall than said second pair of diagonal structural members.

12. The energy absorbing and distributing side impact system of claim 1, further comprising:
    a pair of rear torque boxes, said pair of rear torque boxes comprising a left hand rear torque box mechanically coupled to said left hand side sill assembly and a right hand rear torque box mechanically coupled to said right hand side sill assembly; and
    at least one rear torque box cross-member interposed between said left hand rear torque box and said right hand rear torque box, wherein said at least one rear torque box cross-member is mechanically coupled to both said left hand rear torque box and said right hand rear torque box;
    wherein said left hand rear torque box is welded to said left hand side sill assembly and said right hand rear torque box is welded to said right hand side sill assembly, and wherein said at least one rear torque box cross-member is welded to both said left hand rear torque box and said right hand rear torque box.

13. The energy absorbing and distributing side impact system of claim 1, further comprising a pair of front torque boxes, said pair of front torque boxes comprising a left hand front torque box mechanically coupled to said left hand side sill assembly and a right hand front torque box mechanically coupled to said right hand side sill assembly, wherein said left hand front torque box is welded to said left hand side sill assembly and said right hand front torque box is welded to said right hand side sill assembly.

14. The energy absorbing and distributing side impact system of claim 1, further comprising:
a pair of front torque boxes, said pair of front torque boxes comprising a left hand front torque box mechanically coupled to said left hand side sill assembly and a right hand front torque box mechanically coupled to said right hand side sill assembly; and
a toe board cross-member interposed between said left hand front torque box and said right hand front torque box;
wherein said toe board cross-member is mechanically coupled to both said left hand front torque box and said right hand front torque box.

15. The energy absorbing and distributing side impact system of claim 1, wherein said left hand side sill assembly and said right hand side sill assembly are each comprised of a material selected from the group consisting of aluminum extrusions, aluminum alloy extrusions and steel extrusions.

16. The energy absorbing and distributing side impact system of claim 1, wherein said side sill insert is fabricated from an aluminum alloy.

* * * * *